United States Patent
Xue et al.

(10) Patent No.: US 10,813,170 B2
(45) Date of Patent: Oct. 20, 2020

(54) LOCATING METHOD, SYSTEM, AND RELATED DEVICE

(71) Applicant: HUAWEI TECHNOLOGIES CO., LTD., Shenzhen, Guangdong (CN)

(72) Inventors: Jiantao Xue, Beijing (CN); Kailong Wang, Shenzhen (CN); Anjian Li, Beijing (CN); Yuan Gao, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/440,586

(22) Filed: Jun. 13, 2019

(65) Prior Publication Data

US 2019/0297673 A1 Sep. 26, 2019

Related U.S. Application Data

(63) Continuation of application No. PCT/CN2016/109857, filed on Dec. 14, 2016.

(51) Int. Cl.
*H04W 88/08* (2009.01)
*H04W 64/00* (2009.01)
(Continued)

(52) U.S. Cl.
CPC .............. *H04W 88/08* (2013.01); *G01S 5/10* (2013.01); *H04L 5/005* (2013.01); *H04W 4/70* (2018.02);
(Continued)

(58) Field of Classification Search
CPC ....... H04W 88/08; H04W 4/70; H04W 24/10; H04W 48/20; H04W 64/003; H04W 4/02;
(Continued)

(56) References Cited

U.S. PATENT DOCUMENTS 10,313,838 B2 * 6/2019 Sampath ............... H04W 64/00
2011/0039574 A1 2/2011 Charbit et al.
(Continued)

FOREIGN PATENT DOCUMENTS

CN 102472809 A 5/2012
CN 102958154 A 3/2013
(Continued)

*Primary Examiner* — Hoang-Chuong Q Vu
(74) *Attorney, Agent, or Firm* — Womble Bond Dickinson (US) LLP

(57) ABSTRACT

A network device for locating performing following operations: determining a base station set and an auxiliary UE set that participate in locating of to-be-located target UE; receiving from the to-be-located target UE, a first RSTD set of positioning reference signals PRSs sent by any two base stations in the base station set to the to-be-located target UE, and a second RSTD set of a PRS sent by any auxiliary UE in the auxiliary UE set to the to-be-located target UE and a PRS sent by a reference base station in the base station set to the to-be-located target UE; and determining location information of the plurality of to-be-located UEs based on the first RSTD set, the second RSTD set, and location information of base stations included in the base station set. Locating accuracy and flexibility can be improved.

11 Claims, 8 Drawing Sheets

(51) Int. Cl.
   *H04L 5/00* (2006.01)
   *H04W 4/70* (2018.01)
   *H04W 24/10* (2009.01)
   *H04W 48/20* (2009.01)
   *G01S 5/10* (2006.01)
   *H04W 4/02* (2018.01)

(52) U.S. Cl.
   CPC ........... *H04W 24/10* (2013.01); *H04W 48/20* (2013.01); *H04W 64/003* (2013.01); *H04W 4/02* (2013.01)

(58) Field of Classification Search
   CPC ......... H04L 5/005; G01S 5/10; G01S 5/0284; G01S 5/0236
   See application file for complete search history.

(56) References Cited

U.S. PATENT DOCUMENTS

| | | |
|---|---|---|
| 2014/0171111 A1 | 6/2014 | Xiao et al. |
| 2015/0018017 A1 | 1/2015 | Jang et al. |
| 2016/0066174 A1 | 3/2016 | Kim et al. |
| 2016/0095080 A1 | 3/2016 | Khoryaev et al. |
| 2016/0227373 A1 | 8/2016 | Tsai et al. |
| 2016/0337805 A1 | 11/2016 | Liao et al. |
| 2017/0108579 A1* | 4/2017 | Irvine ...................... H01Q 3/36 |
| 2017/0212206 A1* | 7/2017 | Kim ........................ H04W 8/005 |
| 2017/0288897 A1* | 10/2017 | You ........................ H04W 4/029 |
| 2018/0049152 A1 | 2/2018 | Xiao et al. |
| 2018/0063678 A1* | 3/2018 | Zhu ..................... H04W 64/003 |
| 2018/0115865 A1* | 4/2018 | Chae .................... H04W 4/029 |
| 2018/0139578 A1 | 5/2018 | Xiao et al. |
| 2019/0069260 A1* | 2/2019 | Chae ................ H04W 56/0075 |

FOREIGN PATENT DOCUMENTS

| | | |
|---|---|---|
| CN | 103209475 A | 7/2013 |
| CN | 103260237 A | 8/2013 |
| CN | 103841636 A | 6/2014 |
| EP | 2818886 A1 | 12/2014 |
| WO | 2016048509 A1 | 3/2016 |

\* cited by examiner

LOCATING METHOD, SYSTEM, AND RELATED DEVICE

CROSS-REFERENCE TO RELATED APPLICATIONS

This application is a continuation of International Application No. PCT/CN2016/109857, filed on Dec. 14, 2016, the disclosure of which is hereby incorporated by reference in its entirety.

TECHNICAL FIELD

The present invention relates to the field of communications technologies, and in particular, to a locating method, a system, and a related device.

BACKGROUND

A locating service has become an indispensable part of mobile communications and personal communications services, plays an important role in production and life of people, and is faced with diversified requirements. The locating service is a value-added service that is used for obtaining location information (such as longitude and latitude coordinates) of a mobile terminal user by using a mobile communications network of a telecommunications operator and that can provide a corresponding service for the user with support of an electronic map platform. Requirements of users for a locating service show a broad and high-standard development trend. For example, there are locating requirements in many aspects such as security monitoring, disaster emergency response, traffic dispersion, and interactive gaming.

A locating algorithm that is used to perform measurement based on a time difference of arrival (TDOA) is a commonly used locating algorithm. Observed time difference of arrival (OTDOA) and uplink time difference of arrival (UTDOA) are common location technologies used for performing measurement based on a TDOA, and are applied to a mobile cellular network system. A principle of this locating algorithm is as follows: When there are three or more base stations in a system, a location of user equipment (UE) may be determined based on reference signal time differences (RSTD) of positioning reference signals (PRS)/sounding reference signals (SRS) transmitted by different base stations in a downlink direction or in an uplink direction. However, locating accuracy of this locating method needs to be improved, and each UE needs to be able to communicate with the three or more base stations so that locating can be performed. This results in a relatively strong limitation and poor locating flexibility.

SUMMARY

Embodiments of the present invention disclose a locating method, a system, and a related device, to improve locating accuracy and flexibility.

A first aspect of the embodiments of the present invention discloses a locating method, including:

determining, by a location server based on a preset base station selection rule and a neighboring cell measurement result that is sent by any one (to-be-located target UE is used as an example) of a plurality of to-be-located user equipments UEs, a base station set participating in locating of the to-be-located target UE, where the preset base station selection rule may be specifically that adjacent base stations corresponding to relatively large receive power of the to-be-located target UE form the base station set;

determining, by the location server based on a preset auxiliary UE selection rule and an adjacent UE measurement result that is sent by the to-be-located target UE, an auxiliary UE set participating in locating of the to-be-located target UE, where a device-to-device D2D connection is set up between the to-be-located target UE and each auxiliary UE included in the auxiliary UE set, and the preset auxiliary UE selection rule may be specifically that adjacent UEs corresponding to relatively large receive power of the to-be-located target UE form the auxiliary UE set;

receiving, by the location server, a first reference signal time difference RSTD set and a second RSTD set that are sent by the to-be-located target UE, where the first RSTD set is an RSTD set of positioning reference signals PRSs sent by any two base stations in the base station set to the to-be-located target UE, and the second RSTD set is an RSTD set of a PRS sent by any auxiliary UE in the auxiliary UE set to the to-be-located target UE through the D2D connection and a PRS sent by a reference base station in the base station set to the to-be-located target UE; and determining, by the location server, location information of the plurality of to-be-located UEs based on the first RSTD set, the second RSTD set, and location information of base stations included in the base station set.

In one embodiment, before the determining, by a location server based on a preset base station selection rule and a neighboring cell measurement result that is sent by to-be-located target user equipment UE, a base station set participating in locating of the to-be-located target UE, the method further includes:

receiving, by the location server, a location request sent by the to-be-located target UE;

responding, by the location server, to the location request, and configuring measurement parameters for performing neighboring cell measurement and adjacent UE measurement by the to-be-located target UE; and receiving, by the location server, a neighboring cell measurement result and an adjacent UE measurement result that are obtained by performing neighboring cell measurement and adjacent UE measurement based on the measurement parameters and that are sent by the to-be-located target UE.

In one embodiment, after the determining, by the location server based on a preset auxiliary UE selection rule and an adjacent UE measurement result that is sent by the to-be-located target UE, an auxiliary UE set participating in locating of the to-be-located target UE, and before the receiving, by the location server, a first reference signal time difference RSTD set and a second RSTD set that are sent by the to-be-located target UE, the method further includes:

obtaining, by the location server, a first PRS parameter set of the base station set and a second PRS parameter set of the auxiliary UE set; and sending, by the location server, the first PRS parameter set and the second PRS parameter set to the to-be-located target UE, so that the to-be-located target UE listens for, based on the first PRS parameter set, a PRS sent by each base station included in the base station set, and listens for, based on the second PRS parameter set, a PRS sent through the D2D connection by each auxiliary UE included in the auxiliary UE set.

In one embodiment, the determining, by a location server based on a preset base station selection rule and a neighboring cell measurement result that is sent by to-be-located target user equipment UE, a base station set participating in locating of the to-be-located target UE includes:

obtaining, by the location server, an adjacent base station list and receive power that is of the to-be-located target UE and that is corresponding to adjacent base stations, where the adjacent base station list and the receive power are included in the neighboring cell measurement result sent by the to-be-located target user equipment UE; and selecting, by the location server from the adjacent base station list, a preset first quantity of adjacent base stations corresponding to relatively large receive power of the to-be-located target UE, and determining the preset first quantity of base stations as the base station set participating in locating of the to-be-located target UE.

In one embodiment, the determining, by the location server based on a preset auxiliary UE selection rule and an adjacent UE measurement result that is sent by the to-be-located target UE, an auxiliary UE set participating in locating of the to-be-located target UE includes:

obtaining, by the location server, an adjacent UE list and receive power that is of the to-be-located target UE and that is corresponding to adjacent UEs, where the adjacent UE list and the receive power are included in the adjacent UE measurement result sent by the to-be-located target UE; and selecting, by the location server from the adjacent UE list, a preset second quantity of UEs that send location requests to the location server and that are corresponding to relatively large receive power of the to-be-located target UE, and determining the preset second quantity of UEs as the auxiliary UE set participating in locating of the to-be-located target UE.

In one embodiment, the determining, by the location server, location information of the plurality of to-be-located UEs based on the first RSTD set, the second RSTD set, and location information of base stations included in the base station set includes:

determining, by the location server, combined locating equations of the plurality of to-be-located UEs based on the first RSTD set, the second RSTD set, and the location information of the base stations included in the base station set; and performing, by the location server, a plurality of iterations on the combined locating equations of the plurality of to-be-located UEs to solve the combined locating equations of the plurality of to-be-located UEs, and determining the location information of the plurality of to-be-located UEs based on solutions of the combined locating equations of the plurality of to-be-located UEs.

In one embodiment, the performing, by the location server, a plurality of iterations on the combined locating equations of the plurality of to-be-located UEs includes:

obtaining, by the location server, a location error Cramér-Rao bound, obtained when each iteration starts, of each auxiliary UE included in the auxiliary UE set, and using an auxiliary UE with a minimum location error Cramér-Rao bound to participate in each iteration.

A second aspect of the embodiments of the present invention discloses a locating method, including:

sending, by to-be-located target UE, a neighboring cell measurement result and an adjacent UE measurement result to a location server, where the to-be-located target UE is any one of a plurality of to-be-located UEs;

receiving, by the to-be-located target UE, a first PRS parameter set of a base station set and a second PRS parameter set of an auxiliary UE set that are sent by the location server, where the base station set is determined by the location server based on a preset base station selection rule and the neighboring cell measurement result, the auxiliary UE set is determined by the location server based on a preset auxiliary UE selection rule and the adjacent UE measurement result, and a D2D connection is set up between the to-be-located target UE and each auxiliary UE included in the auxiliary UE set;

listening for, by the to-be-located target UE based on the first PRS parameter set, a PRS sent by each base station included in the base station set, and listening for, based on the second PRS parameter set, a PRS sent through the D2D connection by each auxiliary UE included in the auxiliary UE set;

obtaining, by the to-be-located target UE, a first RSTD set of PRSs sent by any two base stations in the base station set to the to-be-located target UE, and obtaining a second RSTD set of a PRS sent by any auxiliary UE in the auxiliary UE set to the to-be-located target UE through the D2D connection and a PRS sent by a reference base station in the base station set to the to-be-located target UE; and sending, by the to-be-located target UE, the first RSTD set and the second RSTD set to the location server, so that the location server determines location information of the plurality of to-be-located UEs based on the first RSTD set, the second RSTD set, and location information of base stations included in the base station set.

In one embodiment, before the sending, by to-be-located target UE, a neighboring cell measurement result and an adjacent UE measurement result to a location server, the method further includes:

sending, by the to-be-located target UE, a location request to the location server;

receiving, by the to-be-located target UE, measurement parameters that are used for neighboring cell measurement and adjacent UE measurement and that are sent by the location server in response to the location request; and performing, by the to-be-located target UE, neighboring cell measurement and adjacent UE measurement based on the measurement parameters, to obtain the neighboring cell measurement result and the adjacent UE measurement result.

A third aspect of the embodiments of the present invention discloses a locating method, including:

determining, by a target base station, a PRS parameter for sending a PRS to to-be-located target UE, where the target base station is any one of a base station set determined by a location server, and the to-be-located target UE is any one of a plurality of to-be-located UEs;

sending, by the target base station, the PRS parameter to the location server, so that the location server sends a PRS parameter set to the to-be-located target UE; and sending, by the target base station, a PRS to the to-be-located target UE, so that the to-be-located target UE listens for the PRS based on the PRS parameter set, and sends, to the location server, a first RSTD set of PRSs sent by any two base stations in the base station set to the to-be-located target UE, and a second RSTD set of a PRS sent by any auxiliary UE in an auxiliary UE set to the to-be-located target UE and a PRS sent by a reference base station in the base station set to the to-be-located target UE, so that the location server determines location information of the plurality of to-be-located UEs based on the first RSTD set, the second RSTD set, and location information of base stations included in the base station set.

In one embodiment, the reference base station is a base station, in the base station set, that serves the to-be-located target UE and whose communication quantity meets a preset condition.

A fourth aspect of the embodiments of the present invention discloses a location server, including:

a determining module, configured to determine, based on a preset base station selection rule and a neighboring cell measurement result that is sent by to-be-located target user equipment UE, a base station set participating in locating of the to-be-located target UE, where the to-be-located target UE is any one of a plurality of to-be-located UEs; and the determining module is further configured to determine, based on a preset auxiliary UE selection rule and an adjacent UE measurement result that is sent by the to-be-located target UE, an auxiliary UE set participating in locating of the to-be-located target UE, where a device-to-device D2D connection is set up between the to-be-located target UE and each auxiliary UE included in the auxiliary UE set;

a receiving module, configured to receive a first reference signal time difference RSTD set and a second RSTD set that are sent by the to-be-located target UE, where the first RSTD set is an RSTD set of positioning reference signals PRSs sent by any two base stations in the base station set to the to-be-located target UE, and the second RSTD set is an RSTD set of a PRS sent by any auxiliary UE in the auxiliary UE set to the to-be-located target UE through the D2D connection and a PRS sent by a reference base station in the base station set to the to-be-located target UE; and a processing module, configured to determine location information of the plurality of to-be-located UEs based on the first RSTD set, the second RSTD set, and location information of base stations included in the base station set.

In one embodiment, the location server further includes a configuration module.

The receiving module is further configured to receive a location request sent by the to-be-located target UE.

The configuration module is configured to respond to the location request, and configure measurement parameters for performing neighboring cell measurement and adjacent UE measurement by the to-be-located target UE.

The receiving module is further configured to receive the neighboring cell measurement result and the adjacent UE measurement result that are obtained by performing neighboring cell measurement and adjacent UE measurement based on the measurement parameters and that are sent by the to-be-located target UE.

In one embodiment, the location server further includes an obtaining module and a sending module.

The obtaining module is configured to obtain a first PRS parameter set of the base station set and a second PRS parameter set of the auxiliary UE set.

The sending module is configured to send the first PRS parameter set and the second PRS parameter set to the to-be-located target UE, so that the to-be-located target UE listens for, based on the first PRS parameter set, a PRS sent by each base station included in the base station set, and listens for, based on the second PRS parameter set, a PRS sent through the D2D connection by each auxiliary UE included in the auxiliary UE set.

In one embodiment, the determining module is configured to:

obtain an adjacent base station list and receive power that is of the to-be-located target UE and that is corresponding to adjacent base stations, where the adjacent base station list and the receive power are included in the neighboring cell measurement result sent by the to-be-located target user equipment UE; and select, from the adjacent base station list, a preset first quantity of base stations corresponding to relatively large receive power of the to-be-located target UE, and determine the preset first quantity of base stations as the base station set participating in locating of the to-be-located target UE.

In one embodiment, the determining module is configured to:

obtain an adjacent UE list and receive power that is of the to-be-located target UE and that is corresponding to adjacent UEs, where the adjacent UE list and the receive power are included in the adjacent UE measurement result sent by the to-be-located target UE; and select, from the adjacent UE list, a preset second quantity of UEs that send location requests to the location server and that are corresponding to relatively large receive power of the to-be-located target UE, and determine the preset second quantity of UEs as the auxiliary UE set participating in locating of the to-be-located target UE.

In one embodiment, the processing module is configured to:

determine combined locating equations of the plurality of to-be-located UEs based on the first RSTD set, the second RSTD set, and the location information of the base stations included in the base station set; and perform a plurality of iterations on the combined locating equations of the plurality of to-be-located UEs to solve the combined locating equations of the plurality of to-be-located UEs, and determine the location information of the plurality of to-be-located UEs based on solutions of the combined locating equations of the plurality of to-be-located UEs.

In one embodiment, the processing module is configured to:

obtain a location error Cramér-Rao bound, obtained when each iteration starts, of each auxiliary UE included in the auxiliary UE set, and use an auxiliary UE with a minimum location error Cramér-Rao bound to participate in each iteration.

A fifth aspect of the embodiments of the present invention discloses a UE, including:

a sending module, configured to send a neighboring cell measurement result and an adjacent UE measurement result to a location server, where the UE is any one of a plurality of to-be-located UEs;

a receiving module, configured to receive a first PRS parameter set of a base station set and a second PRS parameter set of an auxiliary UE set that are sent by the location server, where the base station set is determined by the location server based on a preset base station selection rule and the neighboring cell measurement result, the auxiliary UE set is determined by the location server based on a preset auxiliary UE selection rule and the adjacent UE measurement result, and a D2D connection is set up between the UE and each auxiliary UE included in the auxiliary UE set;

a listening module, configured to listen for, based on the first PRS parameter set, a PRS sent by each base station included in the base station set, and listen for, based on the second PRS parameter set, a PRS sent through the D2D connection by each auxiliary UE included in the auxiliary UE set; and an obtaining module, configured to obtain a first RSTD set of PRSs sent by any two base stations in the base station set to the UE, and obtain a second RSTD set of a PRS sent by any auxiliary UE in the auxiliary UE set to the UE through the D2D connection and a PRS sent by a reference base station in the base station set to the UE, where the sending module is further configured to send the first RSTD set and the second RSTD set to the location server, so that the location server determines location information of the plurality of to-be-located UEs based on the first RSTD set, the second RSTD set, and location information of base stations included in the base station set.

In one embodiment, the UE further includes a measurement module.

The sending module is further configured to send a location request to the location server.

The receiving module is further configured to receive measurement parameters that are used for neighboring cell measurement and adjacent UE measurement and that are sent by the location server in response to the location request.

The measurement module is configured to perform neighboring cell measurement and adjacent UE measurement based on the measurement parameters, to obtain the neighboring cell measurement result and the adjacent UE measurement result.

A sixth aspect of the embodiments of the present invention discloses a base station, including:

a determining module, configured to determine a PRS parameter for sending a PRS to to-be-located target UE, where the base station is any one of a base station set determined by a location server, and the to-be-located target UE is any one of a plurality of to-be-located UEs; and a sending module, configured to send the PRS parameter to the location server, so that the location server sends a PRS parameter set to the to-be-located target UE, where the sending module is further configured to send a PRS to the to-be-located target UE, so that the to-be-located target UE listens for the PRS based on the PRS parameter set, and sends, to the location server, a first RSTD set of PRSs sent by any two base stations in the base station set to the to-be-located target UE, and a second RSTD set of a PRS sent by any auxiliary UE in an auxiliary UE set to the to-be-located target UE and a PRS sent by a reference base station in the base station set to the to-be-located target UE, so that the location server determines location information of the plurality of to-be-located UEs based on the first RSTD set, the second RSTD set, and location information of base stations included in the base station set.

A seventh aspect of the embodiments of the present invention discloses a locating system, including: the location server according to any implementation of the foregoing fourth aspect, the UE according to any implementation of the foregoing fifth aspect, and the base station according to the foregoing sixth aspect.

An eighth aspect of the embodiments of the present invention discloses a location server, including a processor, a transceiver, and a memory, where the processor, the transceiver, and the memory are connected by using a bus, the memory stores executable program code, the transceiver is configured to send and receive messages under control of the processor, and the processor is configured to invoke the executable program code to perform the locating method according to any implementation of the foregoing first aspect.

A ninth aspect of the embodiments of the present invention discloses UE, including a processor, a transceiver, and a memory, where the processor, the transceiver, and the memory are connected by using a bus, the memory stores executable program code, the transceiver is configured to send and receive messages under control of the processor, and the processor is configured to invoke the executable program code to perform the locating method according to any implementation of the foregoing second aspect.

A tenth aspect of the embodiments of the present invention discloses a base station, including a processor, a transceiver, and a memory, where the processor, the transceiver, and the memory are connected by using a bus, the memory stores executable program code, the transceiver is configured to send and receive messages under control of the processor, and the processor is configured to invoke the executable program code to perform the locating method according to any implementation of the foregoing third aspect.

In the embodiments of the present invention, the location server determines, based on the preset base station selection rule and the neighboring cell measurement result of the to-be-located target user equipment UE, the base station set participating in locating of the to-be-located target UE, and determines, based on the preset auxiliary UE selection rule and the adjacent UE measurement result of the to-be-located target UE, the auxiliary UE set participating in locating of the to-be-located target UE, where the to-be-located target UE is any one of the plurality of to-be-located UEs. The location server receives, from the to-be-located target UE, the first RSTD set of positioning reference signals PRSs sent by any two base stations in the base station set to the to-be-located target UE, and the second RSTD set of a PRS sent by any auxiliary UE in the auxiliary UE set to the to-be-located target UE and a PRS sent by a reference base station in the base station set to the to-be-located target UE, and then determines the location information of the plurality of to-be-located UEs based on the first RSTD set, the second RSTD set, and the location information of the base stations included in the base station set. In this way, locating accuracy and flexibility can be improved.

DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1A:
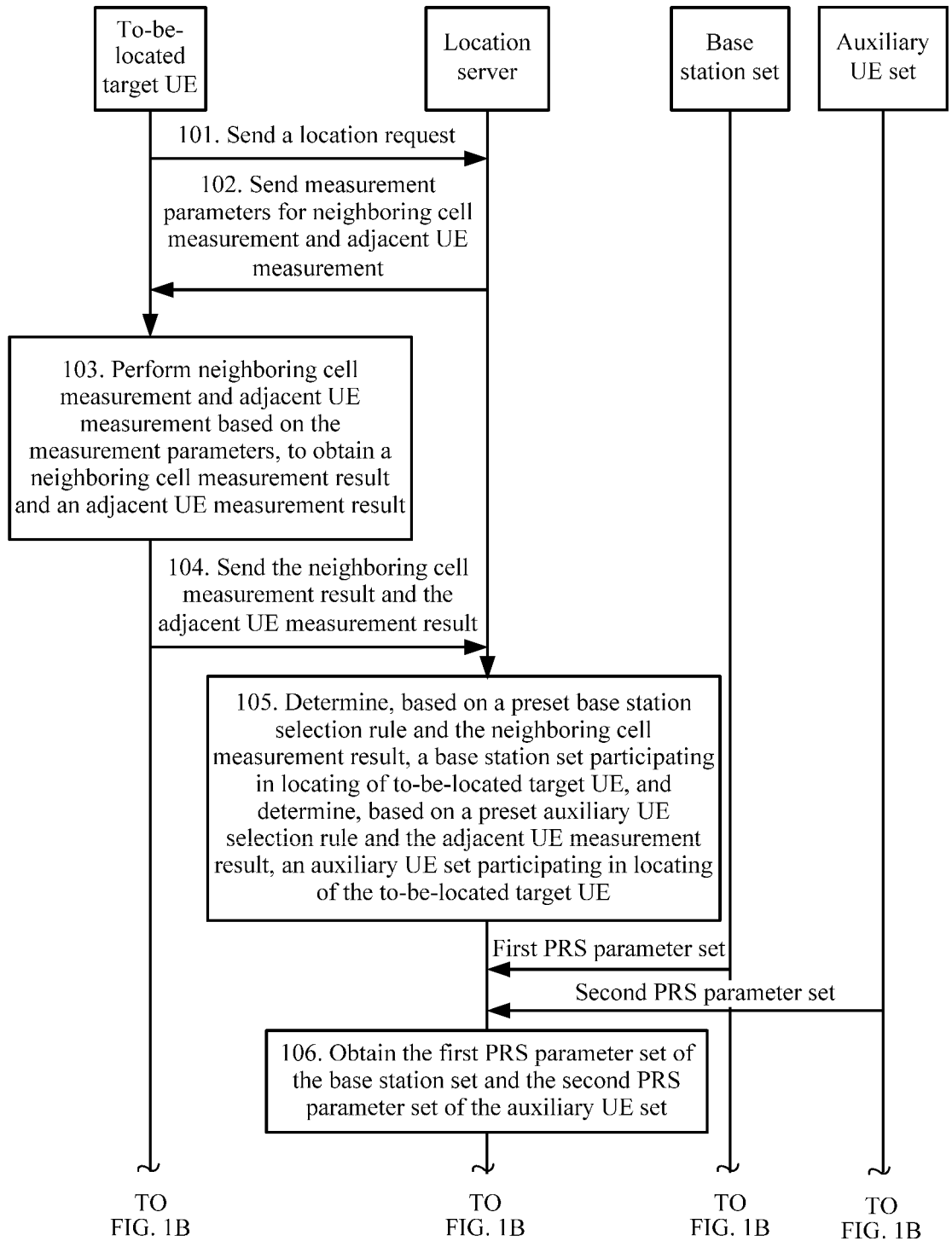
FIG. 1a and FIG. 1b are a schematic flowchart of a locating method disclosed in an embodiment of the present invention.

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The technical solutions of the embodiments of the present invention may be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunications System (UMTS), or a Worldwide Interoperability for Microwave Access (WIMAX) communications system.

A user equipment (UE) in the embodiments of the present invention includes a terminal, a mobile station (MS), a mobile terminal, or the like. For example, the UE may be a mobile phone, a computer with a mobile terminal, or the like, and the UE may be alternatively a portable, pocket-sized, handheld, computer built-in, or in-vehicle mobile apparatus.

A base station in the embodiments of the present invention includes a macro base station, an LMU, a micro base station, a pico base station, a pico remote radio unit (pRRU) and a remote radio head (RRH) that belong to a same macro base station, a pRRU and an RRH that belong to different macro base stations, or the like, and may specifically include a base station (BS) in a GSM or CDMA system, a NodeB (NB) in a WCDMA system, or an evolved NodeB (eNB) in an LTE system. The LMU is a network element that participates in locating in a UTDOA technology and that receives an SRS sent by UE. The LMU is a logical entity, and may be deployed on a same device as a base station, or may be an independent network element device.

A location server (E-SMLC) in the embodiments of the present invention is in general any logical entity responsible for locating in a system.

A method in which locating measurement is completed based on a time difference of signal arrival is referred to as TDOA locating. UTDOA locating and OTDOA locating may be included based on an uplink reference signal (SRS) and a downlink reference signal (PRS) that are used in locating measurement. In the embodiments of the present invention, all technologies used for performing measurement based on a time difference of signal arrival to implement locating belong to UTDOA locating or OTODA locating, and the focus is on OTDOA.

A device-to-device (D2D) technology enables data to be transmitted between adjacent UEs within a short distance in a cell through a direct link, instead of being forwarded by a central node (that is, a base station). D2D and a mobile cellular network system share a licensed frequency band, facilitating centralized interference control and power allocation, and ensuring relatively high communication reliability.

Figure 1B:
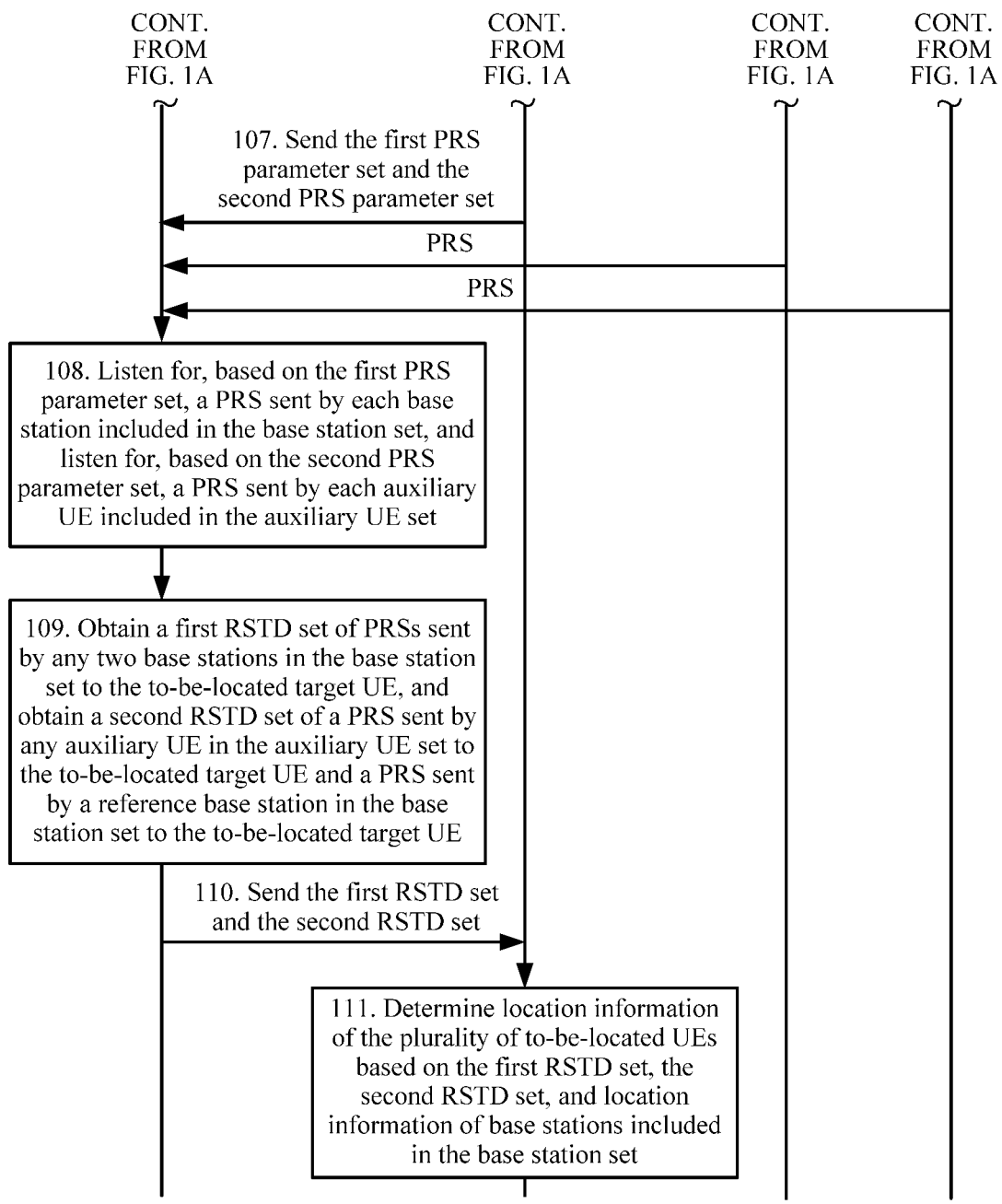

FIG. 1a and FIG. 1b are a schematic flowchart of a locating method according to an embodiment of the present invention. The locating method described in this embodiment includes the following operations.

Operation 101: To-be-located target UE sends a location request to a location server.

The to-be-located target UE is any one of a plurality of to-be-located UEs that send location requests to the location server.

Operation 102: The location server responds to the location request, and sends measurement parameters for neighboring cell measurement and adjacent UE measurement to the to-be-located target UE.

In one embodiment, the location server responds to the location request, configures, for the to-be-located target UE, a measurement parameter for performing neighboring cell measurement and a measurement parameter for performing adjacent UE measurement, and sends the measurement parameters to the to-be-located target UE.

Operation 103: The to-be-located target UE receives the measurement parameters, and performs neighboring cell measurement and adjacent UE measurement based on the measurement parameters, to obtain a neighboring cell measurement result and an adjacent UE measurement result.

Operation 104: The to-be-located target UE sends the neighboring cell measurement result and the adjacent UE measurement result to the location server.

The neighboring cell measurement result includes an adjacent base station list and receive power that is of the to-be-located target UE and that is corresponding to adjacent base stations, and the adjacent UE measurement result includes an adjacent UE list and receive power that is of the to-be-located target UE and that is corresponding to adjacent UEs.

In one embodiment, the to-be-located target UE performs neighboring cell measurement and adjacent UE measurement based on the corresponding measurement parameters, and sends the obtained neighboring cell measurement result and adjacent UE measurement result to the location server.

Operation 105: The location server determines, based on a preset base station selection rule and the neighboring cell measurement result, a base station set participating in locating of the to-be-located target UE, and determines, based on a preset auxiliary UE selection rule and the adjacent UE measurement result, an auxiliary UE set participating in locating of the to-be-located target UE.

A D2D connection is set up between the to-be-located target UE and each auxiliary UE included in the auxiliary UE set.

In one embodiment, a manner in which the location server determines the base station set participating in locating of the to-be-located target UE may be as follows: The location server obtains the adjacent base station list and the receive power that is of the to-be-located target UE and that is corresponding to the adjacent base stations that are included in the neighboring cell measurement result, selects, from the adjacent base station list, a preset first quantity (for example, two or more than two) of base stations corresponding to relatively large receive power of the to-be-located target UE, and determines the preset first quantity of base stations as the base station set participating in locating of the to-be-located target UE.

In addition, a manner in which the location server determines the auxiliary UE set participating in locating of the to-be-located target UE may be as follows: The location server obtains the adjacent UE list and the receive power that is of the to-be-located target UE and that is corresponding to the adjacent UEs that are included in the adjacent UE measurement result, selects, from the adjacent UE list, a preset second quantity (for example, one or more than one) of UEs that also send location requests to the location server at the same time or in a same time segment and that are corresponding to relatively large receive power of the to-be-located target UE, and determines the preset second quantity of UEs as the auxiliary UE set participating in locating of the to-be-located target UE.

Operation 106: The location server obtains a first PRS parameter set of the base station set and a second PRS parameter set of the auxiliary UE set.

In one embodiment, each base station included in the base station set reports, to the location server, a PRS parameter for sending a PRS, and each auxiliary UE included in the auxiliary UE set also reports, to the location server, a PRS parameter for sending a PRS. In other words, a base station sends a PRS to the to-be-located target UE to participate in a locating process of the to-be-located target UE, and auxiliary UE also sends a PRS to the to-be-located target UE through a D2D connection to participate in the locating process of the to-be-located target UE. The location server summarizes the PRS parameters reported by the base stations included in the base station set, as the first PRS parameter set, and summarizes the PRS parameters reported by the auxiliary UEs included in the auxiliary UE set, as the second PRS parameter set.

Operation 107: The location server sends the first PRS parameter set and the second PRS parameter set to the to-be-located target UE.

Operation 108: The to-be-located target UE listens for, based on the first PRS parameter set, a PRS sent by each base station included in the base station set, and listens for, based on the second PRS parameter set, a PRS sent by each auxiliary UE included in the auxiliary UE set.

In one embodiment, the location server sends, to the to-be-located target UE, the first PRS parameter set corresponding to the base station set and the second PRS parameter set corresponding to the auxiliary UE set. Each base station included in the base station set sends a PRS to the to-be-located target UE, and sends sending timing information of the PRS. Each auxiliary UE included in the auxiliary UE set also sends a PRS to the to-be-located target UE, and sends sending timing information of the PRS. The to-be-located target UE listens for, based on the first PRS parameter set, the PRS sent by each base station included in the base station set, and listens for, based on the second PRS parameter set, the PRS sent through the D2D connection by each auxiliary UE included in the auxiliary UE set.

Operation 109: The to-be-located target UE obtains a first RSTD set of PRSs sent by any two base stations in the base station set to the to-be-located target UE, and obtains a second RSTD set of a PRS sent by any auxiliary UE in the auxiliary UE set to the to-be-located target UE and a PRS sent by a reference base station in the base station set to the to-be-located target UE.

The reference base station is a base station, in the base station set, that provides a service for the to-be-located target UE and whose communication quantity meets a preset condition (that is, communication quality is good).

In one embodiment, for the PRS sent by each base station included in the base station set, the to-be-located target UE obtains, based on the sending timing information of the PRS, a time of arrival (TOA) of the PRS sent by each base station included in the base station set to the to-be-located target UE. By subtracting between TOAs of any two base stations, an RSTD set (denoted as the first RSTD set) of PRSs sent by any two base stations in the base station set to the to-be-located target UE may be obtained. For the PRS sent by each auxiliary UE included in the auxiliary UE set, the to-be-located target UE obtains, based on the sending timing information of the PRS, a TOA of the PRS sent by each auxiliary UE included in the auxiliary UE set to the to-be-located target UE. By subtracting a TOA of any auxiliary UE from a TOA of the reference base station, an RSTD set (denoted as the second RSTD set) of a PRS sent by any auxiliary UE in the auxiliary UE set to the to-be-located target UE and a PRS sent by the reference base station to the to-be-located target UE may be obtained.

Operation 110: The to-be-located target UE sends the first RSTD set and the second RSTD set to the location server.

Operation 111: The location server determines location information of the plurality of to-be-located UEs based on the first RSTD set, the second RSTD set, and location information of base stations included in the base station set.

A difference between distances from any two base stations included in the base station set to the to-be-located target UE, and a difference between a distance from any auxiliary UE included in the auxiliary UE set to the to-be-located target UE and a distance from the reference base station to the to-be-located target UE may be calculated based on RSTDs.

In one embodiment, the location server calculates, based on the first RSTD set, the difference between distances from any two base stations included in the base station set to the to-be-located target UE, and calculates, based on the second RSTD set, the difference between the distance from any auxiliary UE included in the auxiliary UE set to the to-be-located target UE and the distance from the reference base station to the to-be-located target UE. A locating equation for the to-be-located target UE is written by using the distance differences and the location information of the base stations included in the base station set. Then, a corresponding locating equation is also written based on a first RSTD set and a second RSTD set that are reported by another to-be-located UE in the plurality of to-be-located UEs. In this way, combined locating equations for the plurality of to-be-located UEs may be determined.

Further, the location server may use a Gauss-Newton iteration method to perform a plurality of iterations on the combined locating equations of the plurality of to-be-located UEs to solve the combined locating equations of the plurality of to-be-located UEs, and determine the location information of the plurality of to-be-located UEs based on solutions of the combined locating equations of the plurality of to-be-located UEs.

The locating equation written for the to-be-located target UE is a hyperbolic equation with locations of two base stations as two focuses or with a location of the reference base station as one focus and a location of auxiliary UE as the other focus. Hyperbolic equations for the plurality of to-be-located UEs are combined to obtain a combined locating hyperbolic equation set for the plurality of to-be-located UEs. The combined locating hyperbolic equation set is solved to obtain a plurality of intersections between hyperbolas. Locations of the plurality of to-be-located UEs may be determined based on the plurality of intersections of the hyperbolas.

It should be noted that a UTDOA locating principle is basically the same as an OTDOA locating principle, except that an uplink reference signal SRS is used, UE sends an SRS, and a base station receives the SRS. Details are not described herein again.

Figure 2A:
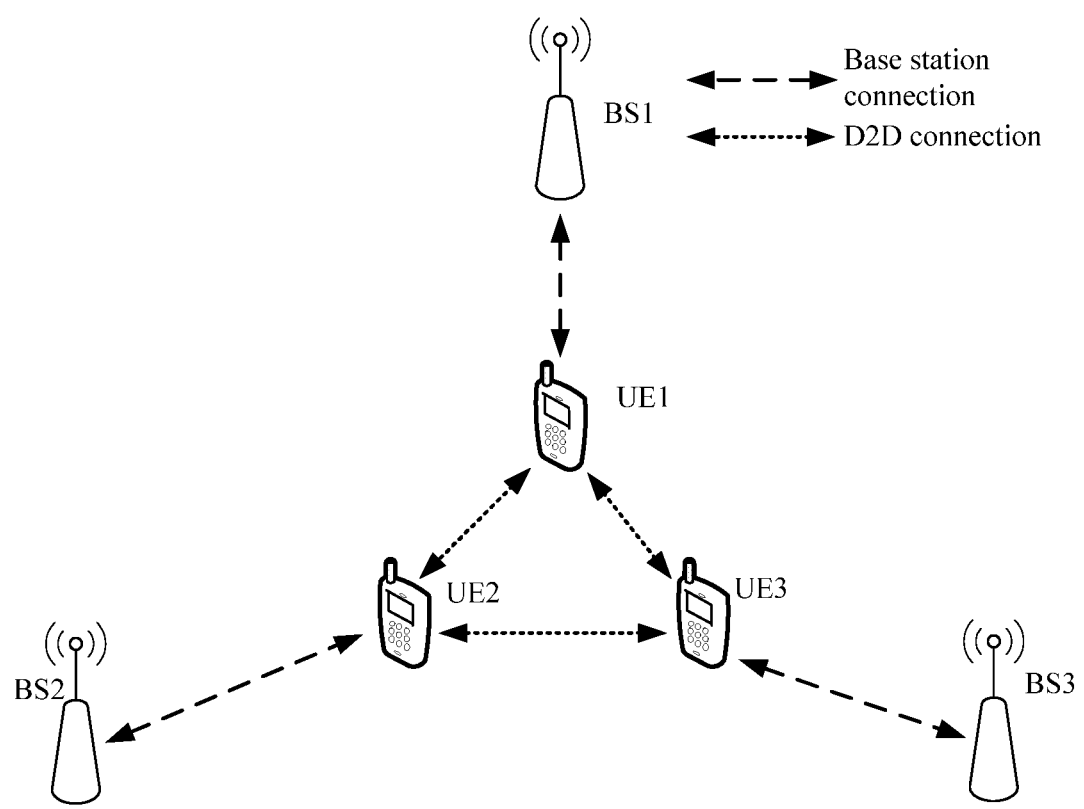
FIG. 2a is a schematic diagram of a locating scenario disclosed in an embodiment of the present invention.

For example, in a locating scenario 1 shown in FIG. 2a, a base station is labeled by a BS, and UE1, UE2, and UE3 are to-be-located UEs. D2D connections are set up between the UE1, the UE2, and the UE3. The UE1, the UE2, and the UE3 each may communicate with one base station. Specifically, the UE1 communicates with a BS1, the UE2 communicates with a BS2, and the UE3 communicates with a BS3. A base station set formed by the BS1, and an auxiliary UE set formed by the UE2 and the UE3 participate in locating of the UE1; a base station set formed by the BS2, and an auxiliary UE set formed by the UE1 and the UE3 participate in locating of the UE2; and a base station set formed by the BS3, and an auxiliary UE set formed by the UE1 and the UE2 participate in locating of the UE3. It is assumed that x, y, and z coordinates of a $B_i$, i=1, 2, 3 are represented as $x_{s_i}$, $y_{s_i}$, and $z_{s_i}$, respectively; and x, y, and z coordinates of $UE_j$, j=1, 2, 3 are represented as $x_j$, $y_j$, and $z_j$ (the z coordinate of UE is 0 by default), respectively. $TOA_{UE_iUE_j}$ represents a true value of a time that it takes for a signal to arrive at the $UE_j$ from $UE_i$, $TOA_{BS_iUE_j}$ represents a true value of a time that it takes for a signal to arrive at the $UE_j$ from the $BS_i$, and c represents a speed of light. $\delta_{UE_iU_j}$ represents a measurement error of a distance from the $UE_i$ to the $UE_j$, and $\delta_{BS_iU_j}$ represents a measurement error of a distance from the $BS_i$ to the $UE_j$. In addition, for easy representation, $\delta_{UE_iUE_j} - \delta_{BS_mUE_j} = \delta_{i,j}^{(m)}$ represents a distance difference measurement error. Based on a quantity of communications links existing in FIG. 2a, the following combined locating hyperbolic equation set may be written for the UE1, the UE2, and the UE3:

$$(\sqrt{(x_2-x_1)^2+(y_2-y_1)^2} - \sqrt{(x_{s_1}-x_1)^2+(y_{s_1}-y_1)^2+z_{s_1}^2}) - c*(TOA_{UE_2UE_1} - TOA_{BS_1UE_1}) = \delta_{UE_2UE_1} - \delta_{BS_1UE_1} = \delta_{2,1}^{(1)}$$

$$(\sqrt{(x_3-x_1)^2+(y_3-y_1)^2} - \sqrt{(x_{s_1}-x_1)^2+(y_{s_1}-y_1)^2+z_{s_1}^2}) - c*(TOA_{UE_3UE_1} - TOA_{BS_1UE_1}) = \delta_{UE_3UE_1} - \delta_{BS_1UE_1} = \delta_{3,1}^{(1)}$$

$$(\sqrt{(x_1-x_2)^2+(y_1-y_2)^2} - \sqrt{(x_{s_2}-x_2)^2+(y_{s_2}-y_2)^2+z_{s_2}^2}) - c*(TOA_{UE_1UE_2} - TOA_{BS_2UE_2}) = \delta_{UE_1UE_2} - \delta_{BS_2UE_2} = \delta_{1,2}^{(2)}$$

$$(\sqrt{(x_3-x_2)^2+(y_3-y_2)^2} - \sqrt{(x_{s_2}-x_2)^2+(y_{s_2}-y_2)^2+z_{s_2}^2}) - c*(TOA_{UE_3UE_2} - TOA_{BS_2UE_2}) = \delta_{UE_3UE_2} - \delta_{BS_2UE_2} = \delta_{3,2}^{(2)}$$

$$(\sqrt{(x_1-x_3)^2+(y_1-y_3)^2} - \sqrt{(x_{s_3}-x_3)^2+(y_{s_3}-y_3)^2+z_{s_3}^2}) - c*(TOA_{UE_1UE_3} - TOA_{BS_3UE_3}) = \delta_{UE_1UE_3} - \delta_{BS_3UE_3} = \delta_{1,3}^{(3)}$$

$$(\sqrt{(x_2-x_3)^2+(y_2-y_3)^2} - \sqrt{(x_{s_3}-x_3)^2+(y_{s_3}-y_3)^2+z_{s_3}^2}) - c*(TOA_{UE_2UE_3} - TOA_{BS_3UE_3}) = \delta_{UE_2UE_3} - \delta_{BS_3UE_3} = \delta_{2,3}^{(3)}$$

It can be learned that each to-be-located UE also communicates with other two to-be-located UEs in addition to communicating with a base station. Therefore, there are three communications links connected to each to-be-located UE. Coordinates of to-be-located UE may be obtained by solving the combined locating hyperbolic equation set.

In addition, by observing a structure of the combined locating hyperbolic equation set, it may be found that each to-be-located UE participates in locating processes of the other to-be-located UEs. Locating information between to-be-located UEs may be used for mutual verification. By extracting TOAs of PRS signals received by the to-be-located UEs, coordinates of all to-be-located UEs may be obtained by solving the combined locating hyperbolic equation set based on known coordinates of base stations.

A manner for solving the combined locating hyperbolic equation set in this locating scenario may be as follows: A set of coordinates of the $UE_1$, the $UE_2$, and the $UE_3$ are found and substituted into equations to obtain a distance difference measurement error $\delta_{i,j}^{(m)}$ corresponding to each equation, to make a quadratic sum of a plurality of $\delta_{i,j}^{(m)}$ closest to 0. $\varphi$ is a threshold, and is a decimal number approximating 0. Specific implementation of an algorithm is described as follows (pseudocode form):

$TOA_{UE_iUE_j}$ (i=1, 2, 3; j=1, 2, 3|i≠j) and $TOA_{BS_iUE_j}$ (i=1, 2, 3; k=1, 2, 3|i=j) are measured.

Three points are laid in a locating area randomly. Coordinates of each point are used as a true value of coordinates of to-be-located UE. Estimated values of coordinates of these points are used (randomly generated values are used as estimated values in an initial iteration, and results of a current iteration are used as estimated values in a next iteration). In each iteration, an estimated value of coordinates of to-be-located UE is represented as $X_k=(x_1,y_1,x_2,y_2,x_3,y_3)$.

For k=1 to a maximum quantity of iterations, the combined locating hyperbolic equation set is used to calculate a residual function in a $k^{th}$ iteration: $\delta_k=(\delta_{2,1}^{(1)}, \delta_{3,1}^{(1)}, \delta_{1,2}^{(2)}, \delta_{3,2}^{(2)}, \delta_{1,3}^{(3)}, \delta_{2,3}^{(3)})$ If $MSD=\frac{1}{2}((\delta_{2,1}^{(1)})^2+(\delta_{3,1}^{(1)})^2+(\delta_{1,2}^{(2)})^2+(\delta_{3,2}^{(2)})^2+(\delta_{1,3}^{(3)})^2+(\delta_{2,3}^{(3)})^2) \leq \varphi$, the iteration ends, and coordinates $X_k=(x_1,y_1,x_2,y_2,x_3,y_3)$ of the iteration are output.

Return

End

A Jacobi matrix is calculated in the $k^{th}$ iteration:

$$J_k = \begin{bmatrix} \nabla \delta_{2,1}^{(1)} \\ \nabla \delta_{3,1}^{(1)} \\ \nabla \delta_{1,2}^{(2)} \\ \nabla \delta_{3,2}^{(2)} \\ \nabla \delta_{1,3}^{(3)} \\ \nabla \delta_{2,3}^{(3)} \end{bmatrix} = \begin{bmatrix} \frac{\partial \delta_{2,1}^{(1)}}{\partial x_1} & \frac{\partial \delta_{2,1}^{(1)}}{\partial y_1} & \frac{\partial \delta_{2,1}^{(1)}}{\partial x_2} & \frac{\partial \delta_{2,1}^{(1)}}{\partial y_2} & \frac{\partial \delta_{2,1}^{(1)}}{\partial x_3} & \frac{\partial \delta_{2,1}^{(1)}}{\partial y_3} \\ \frac{\partial \delta_{3,1}^{(1)}}{\partial x_1} & \frac{\partial \delta_{3,1}^{(1)}}{\partial y_1} & \frac{\partial \delta_{3,1}^{(1)}}{\partial x_2} & \frac{\partial \delta_{3,1}^{(1)}}{\partial y_2} & \frac{\partial \delta_{3,1}^{(1)}}{\partial x_3} & \frac{\partial \delta_{3,1}^{(1)}}{\partial y_3} \\ \frac{\partial \delta_{1,2}^{(2)}}{\partial x_1} & \frac{\partial \delta_{1,2}^{(2)}}{\partial y_1} & \frac{\partial \delta_{1,2}^{(2)}}{\partial x_2} & \frac{\partial \delta_{1,2}^{(2)}}{\partial y_2} & \frac{\partial \delta_{1,2}^{(2)}}{\partial x_3} & \frac{\partial \delta_{1,2}^{(2)}}{\partial y_3} \\ \frac{\partial \delta_{3,2}^{(2)}}{\partial x_1} & \frac{\partial \delta_{3,2}^{(2)}}{\partial y_1} & \frac{\partial \delta_{3,2}^{(2)}}{\partial x_2} & \frac{\partial \delta_{3,2}^{(2)}}{\partial y_2} & \frac{\partial \delta_{3,2}^{(2)}}{\partial x_3} & \frac{\partial \delta_{3,2}^{(2)}}{\partial y_3} \\ \frac{\partial \delta_{1,3}^{(3)}}{\partial x_1} & \frac{\partial \delta_{1,3}^{(3)}}{\partial y_1} & \frac{\partial \delta_{1,3}^{(3)}}{\partial x_2} & \frac{\partial \delta_{1,3}^{(3)}}{\partial y_2} & \frac{\partial \delta_{1,3}^{(3)}}{\partial x_3} & \frac{\partial \delta_{1,3}^{(3)}}{\partial y_3} \\ \frac{\partial \delta_{2,3}^{(3)}}{\partial x_1} & \frac{\partial \delta_{2,3}^{(3)}}{\partial y_1} & \frac{\partial \delta_{2,3}^{(3)}}{\partial x_2} & \frac{\partial \delta_{2,3}^{(3)}}{\partial y_2} & \frac{\partial \delta_{2,3}^{(3)}}{\partial x_3} & \frac{\partial \delta_{2,3}^{(3)}}{\partial y_3} \end{bmatrix}$$

A Gauss-Newton direction $d_k$ is calculated in the $k^{th}$ iteration.

$$J_k^T J_k D_k = -J_k^T \delta_k$$

$$\Rightarrow d_k = (J_k^T J_k)^{-1}(-J_k^T \delta_k)$$

Coordinates $X_{k+1}=X_k+d_k$ of a location of the $UE_i$, i=1, 2, 3 in a next iteration are calculated.

End

Partial derivatives of the equations all exist, and therefore the Jacobi matrix can be calculated.

Figure 2B:
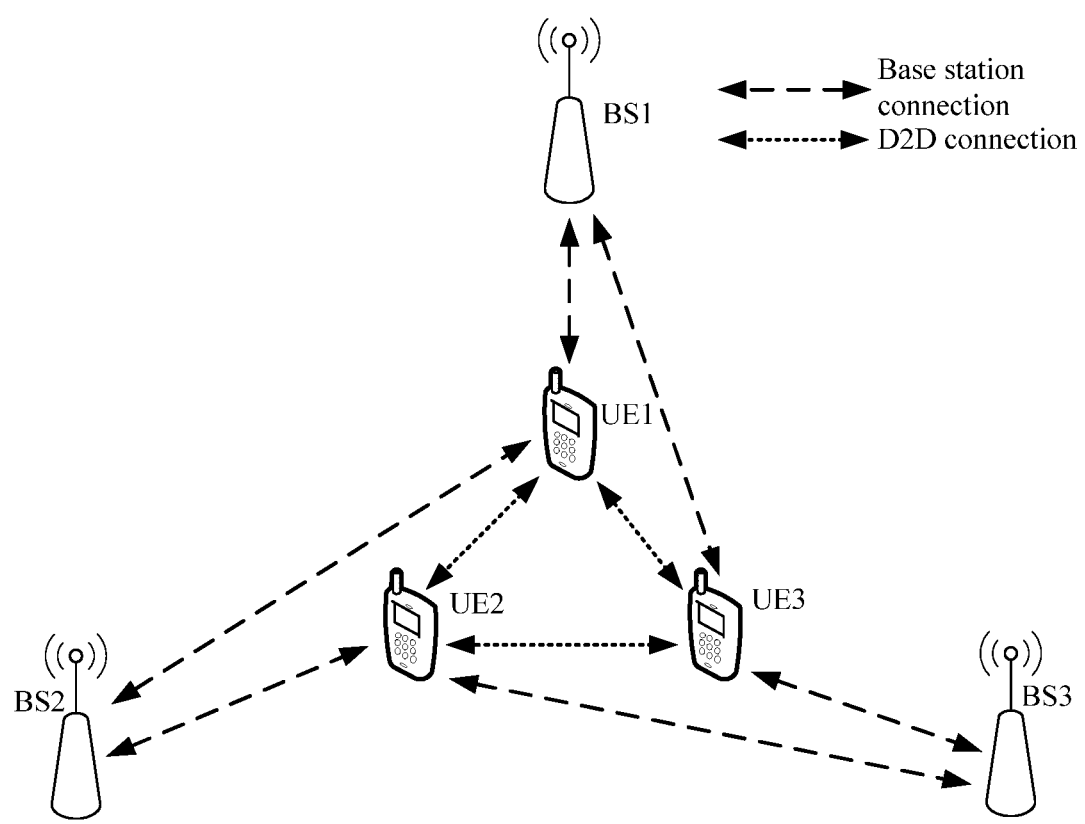
FIG. 2b is a schematic diagram of another locating scenario disclosed in an embodiment of the present invention.

For another example, in a locating scenario 2 shown in FIG. 2b, a base station is labeled by a BS, and UE1, UE2, and UE3 are to-be-located UEs. D2D connections are set up between the UE1, the UE2, and the UE3. The UE1, the UE2, and the UE3 each may communicate with two base stations.

A base station set formed by a BS1 and a BS2, and an auxiliary UE set formed by the UE2 and the UE3 participate in locating of the UE1; a base station set formed by the BS2 and a BS3, and an auxiliary UE set formed by the UE1 and the UE3 participate in locating of the UE2; and a base station set formed by the BS1 and the BS3, and an auxiliary UE set formed by the UE1 and the UE2 participate in locating of the UE3. To-be-located UEs are allowed to communicate with each other in a D2D form, so that each to-be-located UE may also communicate with other to-be-located UEs in addition to communicating with two base stations, and there are more than three communications links connected to each to-be-located UE. Therefore, locations of the to-be-located UEs may be determined. A combined locating hyperbolic equation set and a solving method in this locating scenario are similar to those in the locating scenario 1, and details are not described herein again.

Figure 2C:
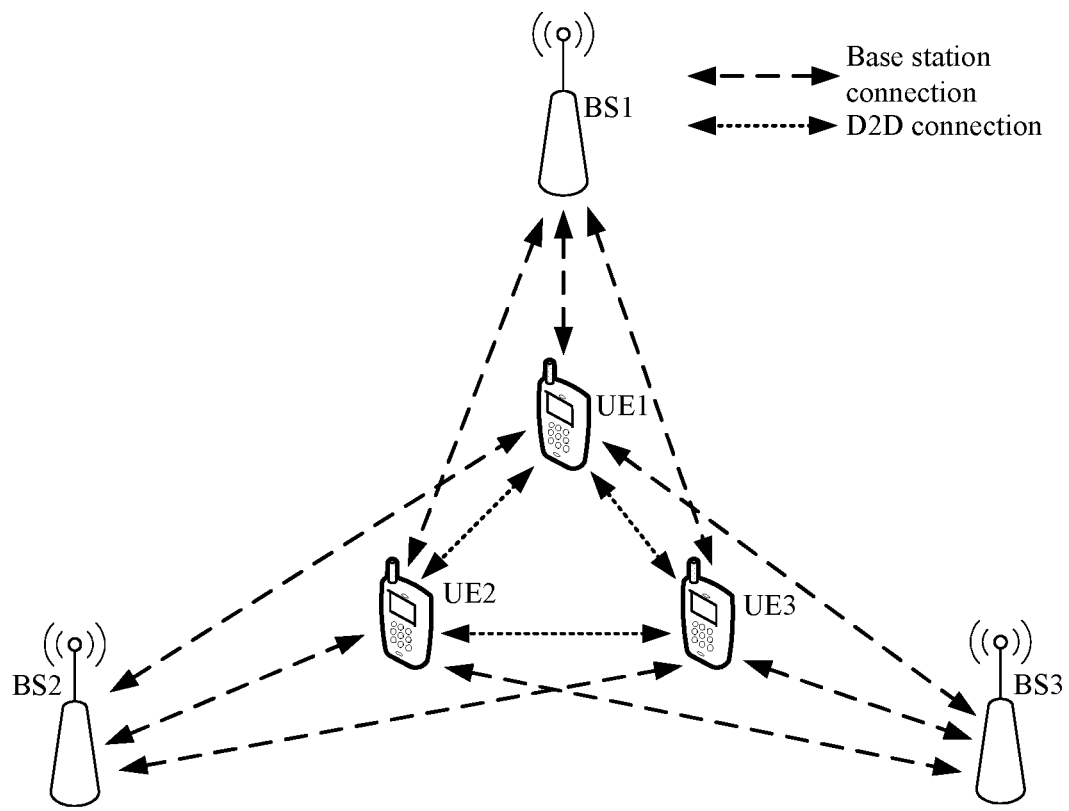
FIG. 2c is a schematic diagram of still another locating scenario disclosed in an embodiment of the present invention.

For still another example, in a locating scenario 3 shown in FIG. 2c, a base station is labeled by a BS, and UE1, UE2, and UE3 are to-be-located UEs. D2D connections are set up between the UE1, the UE2, and the UE3. The UE1, the UE2, and the UE3 each may communicate with three base stations. A base station set formed by a BS1, a BS2, and a BS3, and an auxiliary UE set formed by the UE2 and the UE3 participate in locating of the UE1; the base station set formed by the BS1, the BS2, and the BS3, and an auxiliary UE set formed by the UE1 and the UE3 participate in locating of the UE2; and the base station set formed by the BS1, the BS2, and the BS3, and an auxiliary UE set formed by the UE1 and the UE2 participate in locating of the UE3. When each to-be-located UE can communicate with three or more base stations, the to-be-located UE may be located only by using communications links between the to-be-located UE and the base stations. On this basis, if to-be-located UEs are allowed to communicate with each other in a D2D form, a quantity of communications links connected to each to-be-located UE may be increased, and a quantity of effective equations in a combined locating hyperbolic equation set written based on the quantity of communications links is increased, thereby improving locating accuracy for the to-be-located UEs. A combined locating hyperbolic equation set and a solving method in this locating scenario are similar to those in the locating scenario 1, and details are not described herein again.

In some feasible implementations, it is assumed that all possible connections, regardless of a connection from a base station to to-be-located UE or a connection from to-be-located UE to another to-be-located UE, are actually corresponding to communications links, and there is no interference between the communications links. It is assumed that a $BS_i$, $i=1, 2, \ldots, m, \ldots, M$ represents a base station participating in locating, and x, y, and z coordinates of the base station are represented as $x_{s_i}$, $y_{s_i}$, and $z_{s_i}$, respectively. $UE_j$, $j=1, 2, \ldots, n, \ldots, N$ represents to-be-located UE, and x, y, and z coordinates of the to-be-located UE are represented as $x_j$, $y_j$, and $z_j$, respectively. It is assumed herein that the Z coordinate of the to-be-located UE is 0 constantly. $TOA_{UE_iUE_j}$ represents a true value of a time that it takes for a signal to arrive at the $UE_j$ from $UE_i$, and $TOA_{BS_iUE_j}$ represents a true value of a time that it takes for a signal to arrive at the $UE_j$ from the $BS_i$. To facilitate an overall description, a case of $TOA_{UE_iUE_j}$ ($i=1, 2, 3, \ldots, N$; $j=1,2,3, \ldots, N|i=j$) is added. However, when $i=j$, $TOA_{UE_iUE_j}=0$. $\delta_{UE_iUE_j}$ represents a measurement error of a distance from the $UE_i$ to the $UE_j$, and $\delta_{BS_iUE_j}$ represents a measurement error of a distance from the $BS_i$ to the $UE_j$. In addition, for easy representation, $\delta_{UE_iUE_j}-\delta_{BS_mUE_j}=\delta_{i,j}^{(m)}$ represents a distance difference measurement error. Based on a quantity of existing communications links, the following general expression of a combined locating hyperbolic equation set used when locating is performed in combination with D2D may be written for to-be-located UEs:

$$\sqrt{(x_{s_2}-x_1)^2+(y_{s_2}-y_1)^2+z_{s_2}^2}-\sqrt{(x_{s_1}-x_1)^2+(y_{s_1}-y_1)^2+z_{s_1}^2})-c^*(TOA_{BS_2UE_1}-TOA_{BS_1UE_1})=$$
$$\delta_{BS_2UE_1}-\delta_{BS_1UE_1}=\delta_{2,1}$$

$$\Lambda$$

$$\sqrt{(x_{s_M}-x_1)^2+(y_{s_M}-y_1)^2+z_{s_M}^2}-\sqrt{(x_{s_1}-x_1)^2+(y_{s_1}-y_1)^2+z_{s_1}^2})-c^*(TOA_{BS_MUE_1}-TOA_{BS_1UE_1})=$$
$$\delta_{BS_MUE_1}-\delta_{BS_1UE_1}=\delta_{M,1}$$

$$\sqrt{(x_1-x_1)^2+(y_1-y_1)^2}-\sqrt{(x_{s_1}-x_1)^2+(y_{s_1}-y_1)^2+z_{s_1}^2})-c^*(TOA_{UE_1UE_1}-TOA_{BS_1UE_1})=$$
$$\delta_{UE_1UE_1}-\delta_{BS_1UE_1}=\delta_{1,1}^{(1)}$$

$$\Lambda$$

$$\sqrt{(x_N-x_1)^2+(y_N-y_1)^2}-\sqrt{(x_{s_1}-x_1)^2+(y_{s_1}-y_1)^2+z_{s_1}^2})-c^*(TOA_{UE_NUE_1}-TOA_{BS_1UE_1})=$$
$$\delta_{UE_NUE_1}-\delta_{BS_1UE_1}=\delta_{N,1}^{(1)}$$

$$\Lambda$$

$$\sqrt{(x_1-x_1)^2+(y_1-y_1)^2}-\sqrt{(x_{s_M}-x_1)^2+(y_{s_M}-y_1)^2+z_{s_M}^2})-c^*(TOA_{UE_1UE_1}-TOA_{BS_MUE_1})=$$
$$\delta_{UE_1UE_1}-\delta_{BS_MUE_1}=\delta_{1,1}^{(M)}$$

$$\Lambda$$

$$\sqrt{(x_N-x_1)^2+(y_N-y_1)^2}-\sqrt{(x_{s_M}-x_1)^2+(y_{s_M}-y_1)^2+z_{s_M}^2})-c^*(TOA_{UE_NUE_1}-TOA_{BS_MUE_1})=$$
$$\delta_{UE_NUE_1}-\delta_{BS_MUE_1}=\delta_{N,1}^{(M)}$$

$$\Lambda$$

$$\sqrt{(x_{s_2}-x_N)^2+(y_{s_2}-y_N)^2+z_{s_2}^2}-\sqrt{(x_{s_1}-x_N)^2+(y_{s_1}-y_N)^2+z_{s_1}^2})-c^*(TOA_{BS_2UE_N}-TOA_{BS_1UE_N})=$$
$$\delta_{BS_2UE_N}-\delta_{BS_1UE_N}=\delta_{2,N}$$

$$\Lambda$$

$$\sqrt{(x_{s_M}-x_N)^2+(y_{s_M}-y_N)^2+z_{s_M}^2}-\sqrt{(x_{s_1}-x_N)^2+(y_{s_1}-y_N)^2+z_{s_1}^2})-c^*(TOA_{UE_1UE_N}-TOA_{BS_1UE_N})=$$
$$\delta_{UE_1UE_N}-\delta_{BS_1UE_n}=\delta_{1,B}^{(1)}$$

$$\Lambda$$

$$\sqrt{(x_N-x_N)^2+(y_N-y_N)^2}-\sqrt{(x_{s_1}-x_N)^2+(y_{s_1}-y_N)^2+z_{s_1}^2})-c^*(TOA_{UE_NUE_N}-TOA_{BS_1UE_N})=$$
$$\delta_{UE_NUE_N}-\delta_{BS_1UE_N}=\delta_{N,N}^{(1)}$$

$$\Lambda$$

$$\sqrt{(x_1-x_N)^2+(y_1-y_N)^2}-\sqrt{(x_{s_M}-x_N)^2+(y_{s_M}-y_N)^2+z_{s_M}^2})-c^*(TOA_{UE_1UE_N}-TOA_{BS_MUE_N})=$$
$$\delta_{UE_1UE_N}-\delta_{BS_MUE_N}=\delta_{1,N}^{(M)}$$

$$\Lambda$$

$$\sqrt{(x_N-x_N)^2+(y_N-y_N)^2}-\sqrt{(x_{s_M}-x_N)^2+(y_{s_M}-y_N)^2+z_{s_M}^2})-c^*(TOA_{UE_NUE_N}-TOA_{BS_MUE_N})=$$
$$\delta_{UE_NUE_N}-\delta_{BS_MUE_N}=\delta_{N,N}^{(M)}$$

Then, the Gauss-Newton iteration method is used to solve the combined locating hyperbolic equation set that is written. The following uses a pseudocode form to provide a method for solving the combined locating hyperbolic equation set to obtain coordinates of a location of to-be-located UE:

For k=1 to a maximum quantity of iterations,
the combined locating hyperbolic equation set is used to calculate a residual function in a $k^{th}$ iteration:

$$\delta_k = \begin{pmatrix} \delta_{2,1}, \ldots, \delta_{M,1}, \delta^{(1)}_{1,1}, \ldots, \delta^{(1)}_{N,1}, \ldots, \delta^{(M)}_{1,1}, \ldots, \delta^{(M)}_{N,1} \\ \ldots \\ \delta_{2,N}, \ldots, \delta_{M,N}, \delta^{(1)}_{1,N}, \ldots, \delta^{(1)}_{N,N}, \ldots, \delta^{(M)}_{1,N}, \ldots, \delta^{(M)}_{N,N} \end{pmatrix}$$

(Note: $\delta_k$ is k a vector, and is displayed in a plurality of rows for convenience.)
If $$\left( MSD = \frac{1}{2}\left( \left( \sum_{m=2}^{M}\sum_{n=1}^{N}(\delta_{m,n})^2 \right) + \left( \sum_{j=1}^{N}\sum_{m=1}^{M}\sum_{n=1}^{N}(\delta^{(m)}_{n,j})^2 \right) \right) \leq \varphi \right),$$

the iteration ends, and coordinates $X_k=(x_1,y_1,x_2,y_2,x_3,y_3,\ldots,x_N,y_N)$ of the iteration are output.
(In each iteration, an estimated value of coordinates of to-be-located UE is represented as $X_k=(x_1,x_1,x_2,y_2,x_3,y_3,\ldots,x_N,y_N)$.)
Return
End
A Jacobi matrix is calculated in the $k^{th}$ iteration:

$$J_k = \begin{bmatrix} \nabla\delta_{2,1} \\ M \\ \nabla\delta_{M,1} \\ \nabla\delta^{(1)}_{1,1} \\ M \\ \nabla\delta^{(1)}_{N,1} \\ \nabla\delta^{(M)}_{1,1} \\ M \\ \nabla\delta^{(M)}_{N,1} \\ M \\ \nabla\delta_{2,N} \\ M \\ \nabla\delta_{M,N} \\ \nabla\delta^{(1)}_{1,N} \\ M \\ \nabla\delta^{(1)}_{N,N} \\ \nabla\delta^{(M)}_{1,N} \\ M \\ \nabla\delta^{(M)}_{N,N} \end{bmatrix} = \begin{bmatrix} \partial\delta_{2,1}/\partial x_1 & \partial\delta_{2,1}/\partial y_1 & L & \partial\delta_{2,1}/\partial x_N & \partial\delta_{2,1}/\partial y_N \\ M & M & M & M & M \\ \partial\delta_{M,1}/\partial x_1 & \partial\delta_{M,1}/\partial y_1 & L & \partial\delta_{M,1}/\partial x_N & \partial\delta_{M,1}/\partial y_N \\ \partial\delta^{(1)}_{1,1}/\partial x_1 & \partial\delta^{(1)}_{1,1}/\partial y_1 & L & \partial\delta^{(1)}_{1,1}/\partial x_N & \partial\delta^{(1)}_{1,1}/\partial y_N \\ M & M & M & M & M \\ \partial\delta^{(1)}_{N,1}/\partial x_1 & \partial\delta^{(1)}_{N,1}/\partial y_1 & L & \partial\delta^{(1)}_{N,1}/\partial x_N & \partial\delta^{(1)}_{N,1}/\partial y_N \\ \partial\delta^{(M)}_{1,1}/\partial x_1 & \partial\delta^{(M)}_{1,1}/\partial y_1 & L & \partial\delta^{(M)}_{1,1}/\partial x_N & \partial\delta^{(M)}_{1,1}/\partial y_N \\ M & M & M & M & M \\ \partial\delta^{(M)}_{N,1}/\partial x_1 & \partial\delta^{(M)}_{N,1}/\partial y_1 & L & \partial\delta^{(M)}_{N,1}/\partial x_N & \partial\delta^{(M)}_{N,1}/\partial y_N \\ M & M & M & M & M \\ \partial\delta_{2,N}/\partial x_1 & \partial\delta_{2,N}/\partial y_1 & L & \partial\delta_{2,N}/\partial x_N & \partial\delta_{2,N}/\partial y_N \\ M & M & M & M & M \\ \partial\delta_{M,N}/\partial x_1 & \partial\delta_{M,N}/\partial y_1 & L & \partial\delta_{M,N}/\partial x_N & \partial\delta_{M,N}/\partial y_N \\ \partial\delta^{(1)}_{1,N}/\partial x_1 & \partial\delta^{(1)}_{1,N}/\partial y_1 & L & \partial\delta^{(1)}_{1,N}/\partial x_N & \partial\delta^{(1)}_{1,N}/\partial y_N \\ M & M & M & M & M \\ \partial\delta^{(1)}_{N,N}/\partial x_1 & \partial\delta^{(1)}_{N,N}/\partial y_1 & L & \partial\delta^{(1)}_{N,N}/\partial x_N & \partial\delta^{(1)}_{N,N}/\partial y_N \\ \partial\delta^{(M)}_{1,N}/\partial x_1 & \partial\delta^{(M)}_{1,N}/\partial y_1 & L & \partial\delta^{(M)}_{1,N}/\partial x_N & \partial\delta^{(M)}_{1,N}/\partial y_N \\ M & M & L & M & M \\ \partial\delta^{(M)}_{N,N}/\partial x_1 & \partial\delta^{(M)}_{N,N}/\partial y_1 & L & \partial\delta^{(M)}_{N,N}/\partial x_N & \partial\delta^{(M)}_{N,N}/\partial y_N \end{bmatrix}$$

A Gauss-Newton direction $d_k$ is calculated in the $k^{th}$ iteration.

$$J_k^T J_k d_k = -J_k^T \delta_k$$

$$\Rightarrow d_k = (J_k^T J_k)^{-1}(-J_k^T \delta_k)$$

Coordinates $X_{k+1}=X_k+d_k$ of a location of the $UE_i$, i=1, 2, ..., n, ..., N in a next iteration are calculated.
End
Partial derivatives of the equations all exist, and therefore the Jacobi matrix can be calculated.

In some feasible implementations, in a process of locating based on a base station in combination with D2D, limited by factors such as locating network load, power limitation, and privacy, in an actual situation, not all to-be-located UEs sending location requests are willing to or have authority to participate in, as auxiliary UEs, a locating process of another to-be-located UE sending a location request. This requires selection of auxiliary UE participating in a locating process of to-be-located UE. Conventional auxiliary UE selection methods based on signal strength, receive power, a time of signal arrival, and the like are limited by a distance between to-be-selected auxiliary UE and to-be-located UE. In practice, a topological structure (or location distribution) of auxiliary UEs also affects locating of to-be-located UE.

A Cramér-Rao bound (CRB) is a lower performance bound of an unbiased estimator. The Cramér-Rao bound is usually used to evaluate locating performance. The Cramér-Rao bound is used, in a locating process, as a basis for selecting auxiliary UE that participates in the locating process of to-be-located UE sending a location request. The Cramér-Rao bound is calculated by taking inverse of a Fisher matrix (FIM). Assuming that a coordinate vector of $UE^i$ is $X_i$, a Fisher matrix is provided by using the following formula:

$$F(X_i) = \sum_{j \in S_{\rightarrow i}} \frac{1}{\delta^2_{j \rightarrow i}} q_{ij} q_{ij}^T$$

$S_{\rightarrow i}$ represents a set constituted by base stations or auxiliary UEs that send PRSs to to-be-located UE sending a location request, and $\delta_{\rightarrow i}^2$ represents a measurement error of a distance from a node j (a base station or auxiliary UE) to the to-be-located $UE^i$ sending a location request $$q_{ij} = \frac{X_i - X_j}{\|X_i - X_j\|},$$

where $\|\cdot\|$ indicates an operation of calculating a Euclidean distance. A superscript T indicates transposition. For a pseudocode description in the foregoing locating scenario 3, when each iteration starts, assuming that an estimated value of coordinates of the to-be-located $UE^i$ sending a location request is represented as $\hat{X}_i$, and a value of coordinates of a base station that participates in locating of the to-be-located $UE^i$ or an estimated value of coordinates of auxiliary UE that participates in locating of the to-be-located $UE^i$ is represented as $\hat{X}_j$, a location error Cramér-Rao bound of the to-be-located $UE^i$ in this iteration is expressed by the following formula:

$$CRB(\hat{X}_i) = \text{trace}\left(\left[F^{\%}_{(\hat{X}_i)}\right]^{-1}\right),$$

where $$F^{\%}_{(\hat{X}_i)} = \sum_{j \in S_{\to i}} \frac{1}{\delta^2_{j \to i}} q^{\%}_{ij} q^{\%T}_{ij}$$

and $$q^{\%}_{ij} = \frac{\hat{X}_i - \hat{X}_j}{\|\hat{X}_i - \hat{X}_j\|}.$$

In each iteration, it is assumed that, in an initial state, each to-be-located UE sending a location request can receive PRSs sent by at least three base stations. Using coordinates of base stations and estimated values of coordinates, obtained when each iteration starts, of to-be-located UEs sending location requests, a location error Cramér-Rao bound, in this iteration, of each to-be-located UE sending a location request is calculated, and to-be-located UE that has a minimum Cramér-Rao bound and that sends a location request is selected as auxiliary UE to participate in locating processes, in this round of iteration, of all other to-be-located UEs sending location requests. An iteration process does not stop until a quantity of iterations reaches the maximum quantity of iterations or a location error is a minimum value φ, and a locating result is obtained.

It can be learned that, in this implementation, auxiliary UE is selected, based on Cramér-Rao bound calculation, for to-be-located UE sending a location request. Due to comprehensive consideration of a distance and location distribution, this auxiliary UE selection manner is more accurate and appropriate than an existing auxiliary UE selection manner in which only a distance is considered.

In some feasible implementations, for each to-be-located UE sending a location request, a larger quantity of base stations or auxiliary UEs sending PRSs to the to-be-located UE indicates a larger quantity of hyperbolic equations written for the to-be-located UE, and more accurate locating of the to-be-located UE. In addition, better quality of a signal transferred through each communications link for communicating with the to-be-located UE sending a location request indicates more accurate locating of the to-be-located UE. However, with an increase in a quantity of base stations or auxiliary UEs that communicate with to-be-located UE sending a location request, there is mutual interference between communications links, and interference is also caused to signal reception of another to-be-located UE sending a location request. All of these deteriorate, to some extent, quality of signals transmitted through the communications links. Therefore, a trade-off may be made between a quantity of communications links and communication quality to achieve an optimal locating effect. By using an example in which D2D communication between to-be-located UE and other UEs causes interference to D2D communication between the other UEs, a specific interference control and coordination process may be as follows:

For each to-be-located UE sending a location request, a base station (for example, a reference base station) allocates an optimal link from all links that may be used for communication between the base station and the to-be-located UE. The optimal link may be specifically a link with a shortest distance, or may be a link with a maximum transmit power. It is ensured that interference between the optimal links allocated to all the to-be-located UEs is not greater than a preset threshold. Then, for each to-be-located UE, the base station calculates communication interference quantity generated by each addition of a D2D communications link for the to-be-located UE. If the communication interference quantity is less than or equal to a preset threshold of communication interference quantity, the base station adds a corresponding D2D communications link for the to-be-located UE. Communication interference quantity includes communication interference quantity caused by an existing communications link to a newly added D2D communications link, and communication interference quantity caused by a newly added D2D communications link to an existing communications link. Therefore, in this implementation, control and coordination can be well performed for an interference problem existing in a locating process, so that the location solution provided in this embodiment of the present invention has more practical application significance.

In some feasible implementations, in a locating scenario in which a major disastrous accident happens, because infrastructure is inevitably damaged, a locating service that is provided depending solely on a base station may not be performed due to a fault of the base station itself. In this case, to-be-located UE may be located by using a D2D technology: First, the to-be-located UE sends a specially constructed D2D signal for emergency help to surrounding UE that may perform D2D communication; and when receiving the D2D signal for emergency help, the surrounding UE may voluntarily choose to provide locating support (that is, become cooperating UE in a locating process of the to-be-located UE) for the to-be-located UE. The following three locating support manners may be specifically included:

(1) The cooperating UE autonomously sends a location of the cooperating UE with assistance of a network.

(2) The cooperating UE autonomously provides relay for the D2D signal for emergency help. During a relay process, a tag may be added for the D2D signal for emergency help to indicate that the D2D signal for emergency help is an SOS signal having undergone relay. The network preferentially assigns a locating task to this type of cooperating UE that provides assistance for transfer of the D2D signal for emergency help. Alternatively, the network receives the D2D signal for emergency help having undergone a plurality of times of relay or directly receives the D2D signal for emergency help, and preferentially assigns a locating task to the cooperating UE that participates in transfer of the D2D signal for emergency help. The cooperating UE may use an anonymous manner so that the location of the cooperating UE participating in locating of the to-be-located UE is not exposed.

(3) The cooperating UE measures the received D2D signal for emergency help, and sends a measurement result to a location server for locating.

It can be learned that, in this implementation, an emergency locating problem can be resolved in a disaster environment, reducing dependence on a base station. Compared with locating that depends solely on a base station, in this implementation, a UE locating problem in a disaster environment when a base station is damaged is better resolved.

In this embodiment of the present invention, the to-be-located target UE performs neighboring cell measurement and adjacent UE measurement based on the measurement parameters, obtains the neighboring cell measurement result and the adjacent UE measurement result, and sends the neighboring cell measurement result and the adjacent UE measurement result to the location server. The location server determines, based on the preset base station selection rule and the neighboring cell measurement result, the base station set participating in locating of the to-be-located target UE, determines, based on the preset auxiliary UE selection rule and the adjacent UE measurement result, the auxiliary UE set participating in locating of the to-be-located target UE, and sends the first PRS parameter set of the base station set and the second PRS parameter set of the auxiliary UE set to the to-be-located target UE. The to-be-located target UE listens for, based on the first PRS parameter set, the PRS sent by each base station included in the base station set, listens for, based on the second PRS parameter set, the PRS sent by each auxiliary UE included in the auxiliary UE set, obtains the first RSTD set of PRSs sent by any two base stations in the base station set to the to-be-located target UE, obtains the second RSTD set of a PRS sent by any auxiliary UE in the auxiliary UE set to the to-be-located target UE and a PRS sent by a reference base station in the base station set to the to-be-located target UE, and sends the first RSTD set and the second RSTD set to the location server, so that the location server determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

Figure 3:
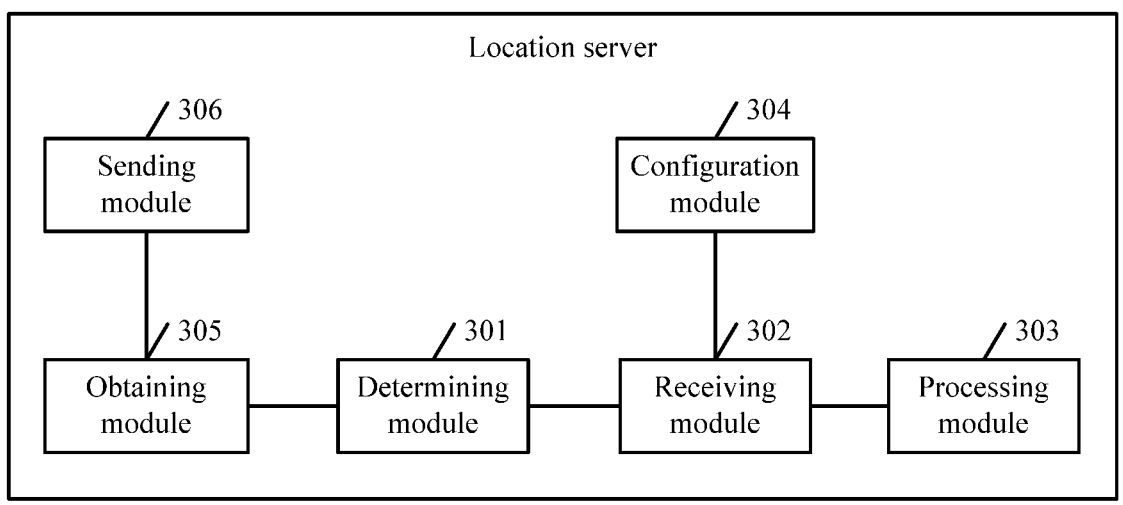
FIG. 3 is a schematic structural diagram of a location server disclosed in an embodiment of the present invention.

FIG. 3 is a schematic structural diagram of a location server according to an embodiment of the present invention. The location server described in this embodiment includes:

a determining module 301, configured to determine, based on a preset base station selection rule and a neighboring cell measurement result that is sent by to-be-located target user equipment UE, a base station set participating in locating of the to-be-located target UE, where the to-be-located target UE is any one of a plurality of to-be-located UEs; and the determining module 301 is further configured to determine, based on a preset auxiliary UE selection rule and an adjacent UE measurement result that is sent by the to-be-located target UE, an auxiliary UE set participating in locating of the to-be-located target UE, where a device-to-device D2D connection is set up between the to-be-located target UE and each auxiliary UE included in the auxiliary UE set;

a receiving module 302, configured to receive a first reference signal time difference RSTD set and a second RSTD set that are sent by the to-be-located target UE, where the first RSTD set is an RSTD set of positioning reference signals PRSs sent by any two base stations in the base station set to the to-be-located target UE, and the second RSTD set is an RSTD set of a PRS sent by any auxiliary UE in the auxiliary UE set to the to-be-located target UE through the D2D connection and a PRS sent by a reference base station in the base station set to the to-be-located target UE; and a processing module 303, configured to determine location information of the plurality of to-be-located UEs based on the first RSTD set, the second RSTD set, and location information of base stations included in the base station set.

In some feasible implementations, the location server further includes a configuration module 304.

The receiving module 302 is further configured to receive a location request sent by the to-be-located target UE.

The configuration module 304 is configured to respond to the location request, and configure measurement parameters for performing neighboring cell measurement and adjacent UE measurement by the to-be-located target UE.

The receiving module 302 is further configured to receive the neighboring cell measurement result and the adjacent UE measurement result that are obtained by performing neighboring cell measurement and adjacent UE measurement based on the measurement parameters and that are sent by the to-be-located target UE.

In some feasible implementations, the location server further includes an obtaining module 305 and a sending module 306.

The obtaining module 305 is configured to obtain a first PRS parameter set of the base station set and a second PRS parameter set of the auxiliary UE set.

The sending module 306 is configured to send the first PRS parameter set and the second PRS parameter set to the to-be-located target UE, so that the to-be-located target UE listens for, based on the first PRS parameter set, a PRS sent by each base station included in the base station set, and listens for, based on the second PRS parameter set, a PRS sent through the D2D connection by each auxiliary UE included in the auxiliary UE set.

In some feasible implementations, the determining module 301 is specifically configured to:

obtain an adjacent base station list and receive power that is of the to-be-located target UE and that is corresponding to adjacent base stations, where the adjacent base station list and the receive power are included in the neighboring cell measurement result sent by the to-be-located target user equipment UE; and select, from the adjacent base station list, a preset first quantity of base stations corresponding to relatively large receive power of the to-be-located target UE, and determine the preset first quantity of base stations as the base station set participating in locating of the to-be-located target UE.

In some feasible implementations, the determining module 301 is specifically configured to:

obtain an adjacent UE list and receive power that is of the to-be-located target UE and that is corresponding to adjacent UEs, where the adjacent UE list and the receive power are included in the adjacent UE measurement result sent by the to-be-located target UE; and select, from the adjacent UE list, a preset second quantity of UEs that send location requests to the location server and that are corresponding to relatively large receive power of the to-be-located target UE, and determine the preset second quantity of UEs as the auxiliary UE set participating in locating of the to-be-located target UE.

In some feasible implementations, the processing module 303 is specifically configured to:

determine combined locating equations of the plurality of to-be-located UEs based on the first RSTD set, the second RSTD set, and the location information of the base stations included in the base station set; and perform a plurality of iterations on the combined locating equations of the plurality of to-be-located UEs to solve the combined locating equations of the plurality of to-be-located UEs, and determine the location information of the plurality of to-be-located UEs based on solutions of the combined locating equations of the plurality of to-be-located UEs.

In some feasible implementations, the processing module 303 is specifically configured to:

obtain a location error Cramér-Rao bound, obtained when each iteration starts, of each auxiliary UE included in the auxiliary UE set, and use an auxiliary UE with a minimum location error Cramér-Rao bound to participate in each iteration.

It can be understood that functions of the function modules of the location server in this embodiment may be specifically implemented based on the method in the foregoing method embodiment. For a specific implementation process thereof, refer to related descriptions in the foregoing method embodiment. Details are not described herein again.

In this embodiment of the present invention, the location server determines, based on the preset base station selection rule and the neighboring cell measurement result of the to-be-located target user equipment UE, the base station set participating in locating of the to-be-located target UE, and determines, based on the preset auxiliary UE selection rule and the adjacent UE measurement result of the to-be-located target UE, the auxiliary UE set participating in locating of the to-be-located target UE, where the to-be-located target UE is any one of the plurality of to-be-located UEs. The location server receives, from the to-be-located target UE, the first RSTD set of positioning reference signals PRSs sent by any two base stations in the base station set to the to-be-located target UE, and the second RSTD set of a PRS sent by any auxiliary UE in the auxiliary UE set to the to-be-located target UE and a PRS sent by a reference base station in the base station set to the to-be-located target UE, and then determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

Figure 4:
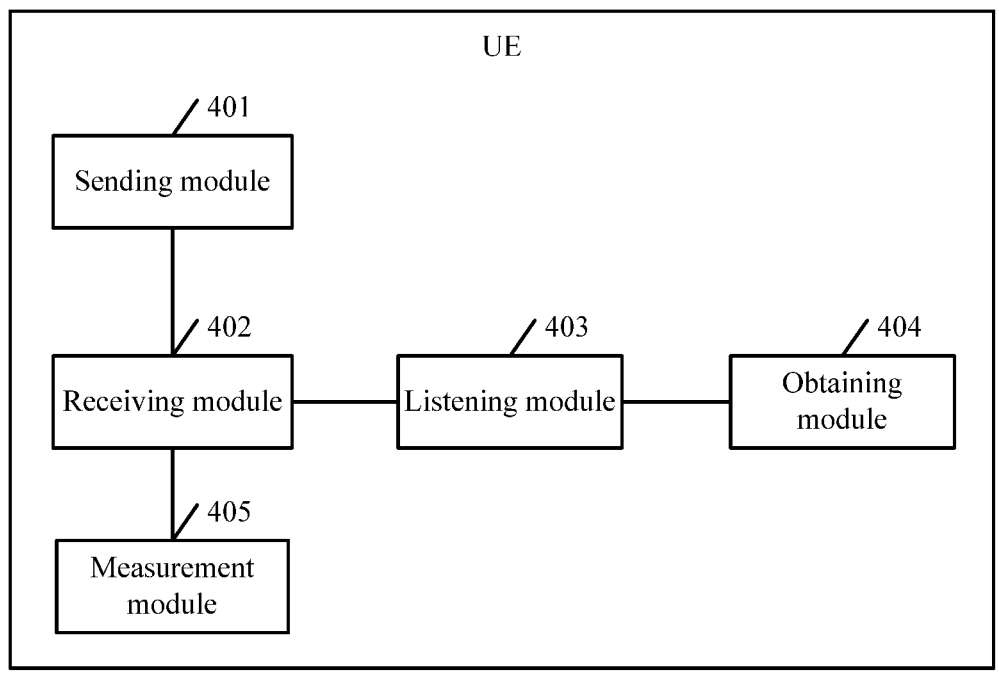
FIG. 4 is a schematic structural diagram of UE disclosed in an embodiment of the present invention.

FIG. 4 is a schematic structural diagram of UE according to an embodiment of the present invention. The UE described in this embodiment includes:

a sending module 401, configured to send a neighboring cell measurement result and an adjacent UE measurement result to a location server, where the UE is any one of a plurality of to-be-located UEs;

a receiving module 402, configured to receive a first PRS parameter set of a base station set and a second PRS parameter set of an auxiliary UE set that are sent by the location server, where the base station set is determined by the location server based on a preset base station selection rule and the neighboring cell measurement result, the auxiliary UE set is determined by the location server based on a preset auxiliary UE selection rule and the adjacent UE measurement result, and a D2D connection is set up between the UE and each auxiliary UE included in the auxiliary UE set;

a listening module 403, configured to listen for, based on the first PRS parameter set, a PRS sent by each base station included in the base station set, and listen for, based on the second PRS parameter set, a PRS sent through the D2D connection by each auxiliary UE included in the auxiliary UE set; and an obtaining module 404, configured to obtain a first RSTD set of PRSs sent by any two base stations in the base station set to the UE, and obtain a second RSTD set of a PRS sent by any auxiliary UE in the auxiliary UE set to the UE through the D2D connection and a PRS sent by a reference base station in the base station set to the UE.

The sending module 401 is further configured to send the first RSTD set and the second RSTD set to the location server, so that the location server determines location information of the plurality of to-be-located UEs based on the first RSTD set, the second RSTD set, and location information of base stations included in the base station set.

In some feasible implementations, the UE further includes a measurement module 405.

The sending module 401 is further configured to send a location request to the location server.

The receiving module 402 is further configured to receive measurement parameters that are used for neighboring cell measurement and adjacent UE measurement and that are sent by the location server in response to the location request.

The measurement module 405 is configured to perform neighboring cell measurement and adjacent UE measurement based on the measurement parameters, to obtain the neighboring cell measurement result and the adjacent UE measurement result.

It can be understood that functions of the function modules of the UE in this embodiment may be specifically implemented based on the method in the foregoing method embodiment. For a specific implementation process thereof, refer to related descriptions in the foregoing method embodiment. Details are not described herein again.

In this embodiment of the present invention, any UE of the plurality of to-be-located UEs sends a neighboring cell measurement result and an adjacent UE measurement result to the location server, receives the first PRS parameter set of the base station set and the second PRS parameter set of the auxiliary UE set that are sent by the location server, listens for, based on the first PRS parameter set, the PRS sent by each base station included in the base station set, listens for, based on the second PRS parameter set, the PRS sent through the D2D connection by each auxiliary UE included in the auxiliary UE set, then obtains the first RSTD set of PRSs sent by any two base stations in the base station set to the UE, obtains the second RSTD set of a PRS sent by any auxiliary UE in the auxiliary UE set to the UE through the D2D connection and a PRS sent by a reference base station in the base station set to the UE, and sends the first RSTD set and the second RSTD set to the location server, so that the location server determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

Figure 5:
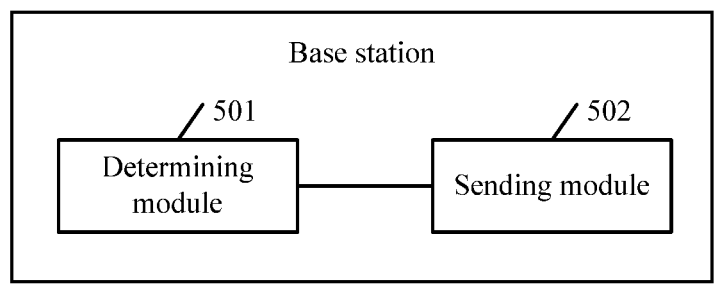
FIG. 5 is a schematic structural diagram of a base station disclosed in an embodiment of the present invention.

FIG. 5 is a schematic structural diagram of a base station according to an embodiment of the present invention. The base station described in this embodiment includes:

a determining module 501, configured to determine a PRS parameter for sending a PRS to to-be-located target UE, where the base station is any one of a base station set determined by a location server, and the to-be-located target UE is any one of a plurality of to-be-located UEs; and a sending module 502, configured to send the PRS parameter to the location server, so that the location server sends a PRS parameter set to the to-be-located target UE.

The sending module 502 is further configured to send a PRS to the to-be-located target UE, so that the to-be-located target UE listens for the PRS based on the PRS parameter set, and sends, to the location server, a first RSTD set of PRSs sent by any two base stations in the base station set to the to-be-located target UE, and a second RSTD set of a PRS sent by any auxiliary UE in an auxiliary UE set to the to-be-located target UE and a PRS sent by a reference base station in the base station set to the to-be-located target UE, so that the location server determines location information of the plurality of to-be-located UEs based on the first RSTD set, the second RSTD set, and location information of base stations included in the base station set.

It can be understood that functions of the function modules of the base station in this embodiment may be specifically implemented based on the method in the foregoing method embodiment. For a specific implementation process thereof, refer to related descriptions in the foregoing method embodiment. Details are not described herein again.

In this embodiment of the present invention, any base station of the base station set determined by the location server determines a PRS parameter for sending a PRS to to-be-located target UE, where the to-be-located target UE is any one of the plurality of to-be-located UEs. The base station sends the PRS parameter to the location server, so that the location server sends a PRS parameter set to the to-be-located target UE; and then sends a PRS to the to-be-located target UE, so that the to-be-located target UE listens for the PRS based on the PRS parameter set, and sends, to the location server, the first RSTD set of PRSs sent by any two base stations in the base station set to the to-be-located target UE, and the second RSTD set of a PRS sent by any auxiliary UE in the auxiliary UE set to the to-be-located target UE and a PRS sent by a reference base station in the base station set to the to-be-located target UE, so that the location server determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

Figure 6:
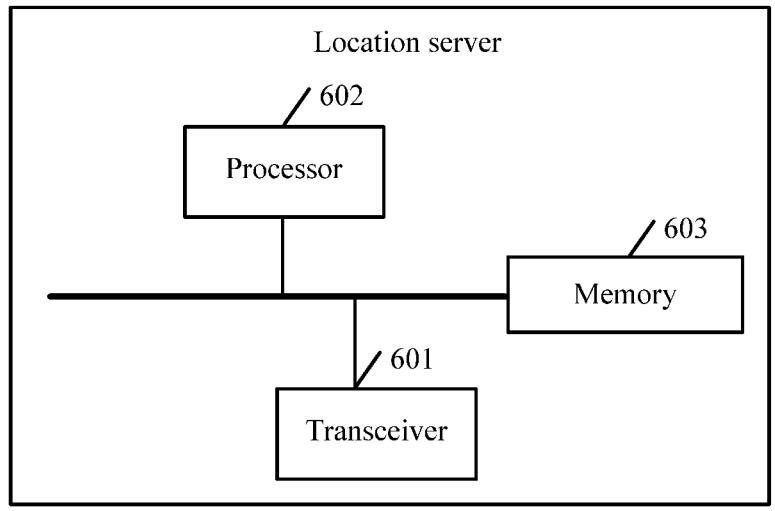
FIG. 6 is a schematic structural diagram of another location server disclosed in an embodiment of the present invention.

FIG. 6 is a schematic structural diagram of another location server according to an embodiment of the present invention. The location server described in this embodiment includes a transceiver 601, a processor 602, and a memory 603. The processor 602 is connected to the transceiver 601 and the memory 603 by using a bus.

The transceiver 601 may be specifically a radio frequency receiver or a radio frequency chip, and is configured to send and receive signals. In one embodiment, the transceiver 601 may include a transmitter (TX) and a receiver (RX) that are integrated. The processor 602 may be in one embodiment a baseband processor, a baseband chip, a digital signal processor (DSP), a system on chip (SOC) that includes a baseband processor and an application processor, or the like.

The memory 603 is configured to store a set of program code. The processor 602 is configured to invoke the program code stored in the memory 603 to perform the following operations.

The processor 602 is configured to determine, based on a preset base station selection rule and a neighboring cell measurement result that is sent by to-be-located target user equipment UE, a base station set participating in locating of the to-be-located target UE, where the to-be-located target UE is any one of a plurality of to-be-located UEs.

The processor 602 is further configured to determine, based on a preset auxiliary UE selection rule and an adjacent UE measurement result that is sent by the to-be-located target UE, an auxiliary UE set participating in locating of the to-be-located target UE, where a device-to-device D2D connection is set up between the to-be-located target UE and each auxiliary UE included in the auxiliary UE set.

The transceiver 601 is configured to receive a first reference signal time difference RSTD set and a second RSTD set that are sent by the to-be-located target UE, where the first RSTD set is an RSTD set of positioning reference signals PRSs sent by any two base stations in the base station set to the to-be-located target UE, and the second RSTD set is an RSTD set of a PRS sent by any auxiliary UE in the auxiliary UE set to the to-be-located target UE through the D2D connection and a PRS sent by a reference base station in the base station set to the to-be-located target UE.

The processor 602 is further configured to determine location information of the plurality of to-be-located UEs based on the first RSTD set, the second RSTD set, and location information of base stations included in the base station set.

In some feasible implementations, the transceiver 601 is further configured to receive a location request sent by the to-be-located target UE.

The processor 602 is further configured to respond to the location request, and configure measurement parameters for performing neighboring cell measurement and adjacent UE measurement by the to-be-located target UE.

The transceiver 601 is further configured to receive the neighboring cell measurement result and the adjacent UE measurement result that are obtained by performing neighboring cell measurement and adjacent UE measurement based on the measurement parameters and that are sent by the to-be-located target UE.

In some feasible implementations, the processor 602 is further configured to obtain a first PRS parameter set of the base station set and a second PRS parameter set of the auxiliary UE set.

The transceiver 601 is further configured to send the first PRS parameter set and the second PRS parameter set to the to-be-located target UE, so that the to-be-located target UE listens for, based on the first PRS parameter set, a PRS sent by each base station included in the base station set, and listens for, based on the second PRS parameter set, a PRS sent through the D2D connection by each auxiliary UE included in the auxiliary UE set.

In some feasible implementations, the processor 602 is specifically configured to:

obtain an adjacent base station list and receive power that is of the to-be-located target UE and that is corresponding to adjacent base stations, where the adjacent base station list and the receive power are included in the neighboring cell measurement result sent by the to-be-located target user equipment UE; and select, from the adjacent base station list, a preset first quantity of base stations corresponding to relatively large receive power of the to-be-located target UE, and determine the preset first quantity of base stations as the base station set participating in locating of the to-be-located target UE.

In some feasible implementations, the processor 602 is specifically configured to:

obtain an adjacent UE list and receive power that is of the to-be-located target UE and that is corresponding to adjacent UEs, where the adjacent UE list and the receive power are included in the adjacent UE measurement result sent by the to-be-located target UE; and select, from the adjacent UE list, a preset second quantity of UEs that send location requests to the location server and that are corresponding to relatively large receive power of the to-be-located target UE, and determine the preset second quantity of UEs as the auxiliary UE set participating in locating of the to-be-located target UE.

In some feasible implementations, the processor 602 is configured to:

determine combined locating equations of the plurality of to-be-located UEs based on the first RSTD set, the second RSTD set, and the location information of the base stations included in the base station set; and perform a plurality of iterations on the combined locating equations of the plurality of to-be-located UEs to solve the combined locating equations of the plurality of to-be-located UEs, and determine the location information of the plurality of to-be-located UEs based on solutions of the combined locating equations of the plurality of to-be-located UEs.

In some feasible implementations, the processor 602 is configured to:

obtain a location error Cramér-Rao bound, obtained when each iteration starts, of each auxiliary UE included in the auxiliary UE set, and use an auxiliary UE with a minimum location error Cramér-Rao bound to participate in each iteration.

In one embodiment, the transceiver 601, the processor 602, and the memory 603 described in this embodiment of the present invention may perform an implementation described in a locating method provided in the embodiments of the present invention, or may perform an implementation of a location server provided in the embodiments of the present invention. Details are not described herein again.

In this embodiment of the present invention, the location server determines, based on the preset base station selection rule and the neighboring cell measurement result of the to-be-located target user equipment UE, the base station set participating in locating of the to-be-located target UE, and determines, based on the preset auxiliary UE selection rule and the adjacent UE measurement result of the to-be-located target UE, the auxiliary UE set participating in locating of the to-be-located target UE, where the to-be-located target UE is any one of the plurality of to-be-located UEs. The location server receives, from the to-be-located target UE, the first RSTD set of positioning reference signals PRSs sent by any two base stations in the base station set to the to-be-located target UE, and the second RSTD set of a PRS sent by any auxiliary UE in the auxiliary UE set to the to-be-located target UE and a PRS sent by a reference base station in the base station set to the to-be-located target UE, and then determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

Figure 7:
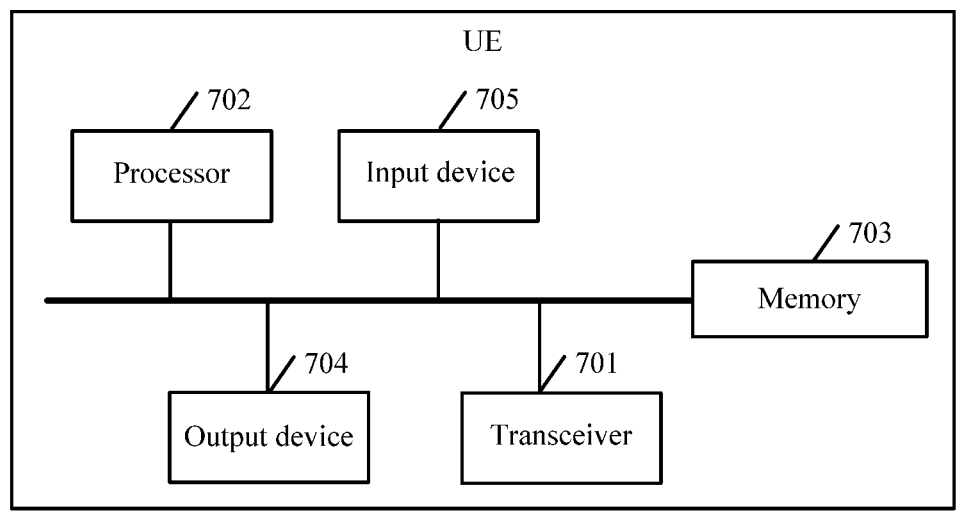
FIG. 7 is a schematic structural diagram of another UE disclosed in an embodiment of the present invention.

FIG. 7 is a schematic structural diagram of another UE according to an embodiment of the present invention. The UE described in this embodiment includes a transceiver 701, a processor 702, a memory 703, an output device 704, and an input device 705. The processor 702 is connected to the transceiver 701, the memory 703, the output device 704, and the input device 705 by using a bus.

The transceiver 701 may be in one embodiment a radio frequency receiver or a radio frequency chip, and is configured to send and receive signals. In one embodiment, the transceiver 701 may include a transmitter and a receiver that are integrated. The processor 702 may be in one embodiment a baseband processor, a baseband chip, a DSP, an SOC, or the like. The memory 703 is a memory device of the UE, and is configured to store a program or data. It can be understood that the memory 703 herein may be a high-speed RAM memory, or may be a non-volatile memory, for example, at least one disk memory. In one embodiment, the memory 703 may be at least one storage device far away from the processor 702.

The output device 704 may include a display. The input device 705 may be a touch panel, a microphone, a camera, or the like. The touch panel includes a touchscreen, a touch control screen, and the like.

The memory 703 is configured to store a set of program code. The processor 702 invokes the program code stored in the memory 703 to perform the following operations.

The transceiver 701 is configured to send a neighboring cell measurement result and an adjacent UE measurement result to a location server, where the UE is any one of a plurality of to-be-located UEs.

The transceiver 701 is further configured to receive a first PRS parameter set of a base station set and a second PRS parameter set of an auxiliary UE set that are sent by the location server, where the base station set is determined by the location server based on a preset base station selection rule and the neighboring cell measurement result, the auxiliary UE set is determined by the location server based on a preset auxiliary UE selection rule and the adjacent UE measurement result, and a D2D connection is set up between the UE and each auxiliary UE included in the auxiliary UE set.

The processor 702 is configured to listen for, based on the first PRS parameter set, a PRS sent by each base station included in the base station set, and listen for, based on the second PRS parameter set, a PRS sent through the D2D connection by each auxiliary UE included in the auxiliary UE set.

The processor 702 is further configured to obtain a first RSTD set of PRSs sent by any two base stations in the base station set to the UE, and obtain a second RSTD set of a PRS sent by any auxiliary UE in the auxiliary UE set to the UE through the D2D connection and a PRS sent by a reference base station in the base station set to the UE.

The transceiver 701 is further configured to send the first RSTD set and the second RSTD set to the location server, so that the location server determines location information of the plurality of to-be-located UEs based on the first RSTD set, the second RSTD set, and location information of base stations included in the base station set.

In some feasible implementations, the transceiver 701 is further configured to send a location request to the location server.

The transceiver 701 is further configured to receive measurement parameters that are used for neighboring cell measurement and adjacent UE measurement and that are sent by the location server in response to the location request.

The processor 702 is further configured to perform neighboring cell measurement and adjacent UE measurement based on the measurement parameters, to obtain the neighboring cell measurement result and the adjacent UE measurement result.

In one embodiment, the transceiver 701, the processor 702, the memory 703, the output device 704, and the input device 705 described in this embodiment of the present invention may perform an implementation described in a locating method provided in the embodiments of the present invention, or may perform an implementation of UE provided in the embodiments of the present invention. Details are not described herein again.

In this embodiment of the present invention, any UE of the plurality of to-be-located UEs sends a neighboring cell measurement result and an adjacent UE measurement result to the location server, receives the first PRS parameter set of the base station set and the second PRS parameter set of the auxiliary UE set that are sent by the location server, listens for, based on the first PRS parameter set, the PRS sent by each base station included in the base station set, listens for, based on the second PRS parameter set, the PRS sent through the D2D connection by each auxiliary UE included in the auxiliary UE set, then obtains the first RSTD set of PRSs sent by any two base stations in the base station set to the UE, obtains the second RSTD set of a PRS sent by any auxiliary UE in the auxiliary UE set to the UE through the D2D connection and a PRS sent by a reference base station in the base station set to the UE, and sends the first RSTD set and the second RSTD set to the location server, so that the location server determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

Figure 8:
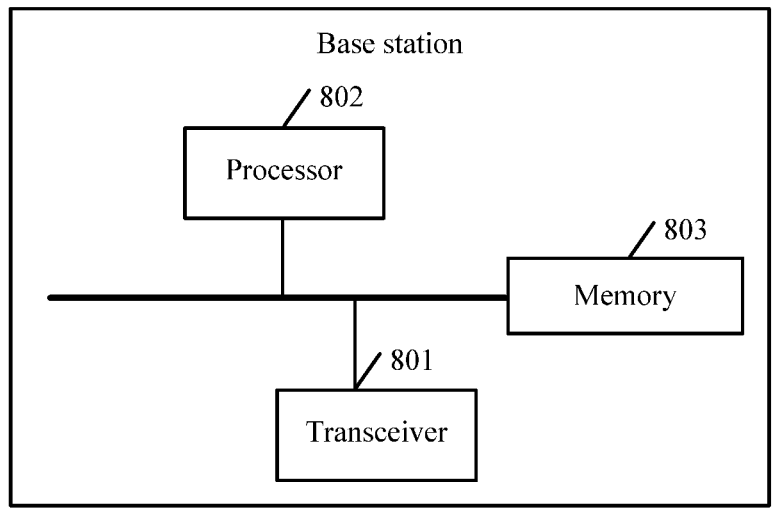
FIG. 8 is a schematic structural diagram of another base station disclosed in an embodiment of the present invention.

FIG. 8 is a schematic structural diagram of another base station according to an embodiment of the present invention. The base station described in this embodiment includes a transceiver 801, a processor 802, and a memory 803. The processor 802 is connected to the transceiver 801 and the memory 803 by using a bus.

The transceiver 801 may be in one embodiment a radio frequency receiver or a radio frequency chip, and is configured to send and receive signals. In one embodiment, the transceiver 801 may include a transmitter and a receiver that are integrated. The processor 802 may be in one embodiment a baseband processor, a baseband chip, a DSP, an SOC, or the like.

The memory 803 is configured to store a set of program code. The processor 802 invokes the program code stored in the memory 803 to perform the following operations.

The processor 802 is configured to determine a PRS parameter for sending a PRS to to-be-located target UE, where the base station is any one of a base station set determined by a location server, and the to-be-located target UE is any one of a plurality of to-be-located UEs.

The transceiver 801 is configured to send the PRS parameter to the location server, so that the location server sends a PRS parameter set to the to-be-located target UE.

The transceiver 801 is further configured to send a PRS to the to-be-located target UE, so that the to-be-located target UE listens for the PRS based on the PRS parameter set, and sends, to the location server, a first RSTD set of PRSs sent by any two base stations in the base station set to the to-be-located target UE, and a second RSTD set of a PRS sent by any auxiliary UE in an auxiliary UE set to the to-be-located target UE and a PRS sent by a reference base station in the base station set to the to-be-located target UE, so that the location server determines location information of the plurality of to-be-located UEs based on the first RSTD set, the second RSTD set, and location information of base stations included in the base station set.

In one embodiment, the transceiver 801, the processor 802, and the memory 803 described in this embodiment of the present invention may perform an implementation described in a locating method provided in the embodiments of the present invention, or may perform an implementation of a base station provided in the embodiments of the present invention. Details are not described herein again.

In this embodiment of the present invention, any base station of the base station set determined by the location server determines a PRS parameter for sending a PRS to to-be-located target UE, where the to-be-located target UE is any one of the plurality of to-be-located UEs. The base station sends the PRS parameter to the location server, so that the location server sends a PRS parameter set to the to-be-located target UE; and then sends a PRS to the to-be-located target UE, so that the to-be-located target UE listens for the PRS based on the PRS parameter set, and sends, to the location server, the first RSTD set of PRSs sent by any two base stations in the base station set to the to-be-located target UE, and the second RSTD set of a PRS sent by any auxiliary UE in the auxiliary UE set to the to-be-located target UE and a PRS sent by a reference base station in the base station set to the to-be-located target UE, so that the location server determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

Figure 9:
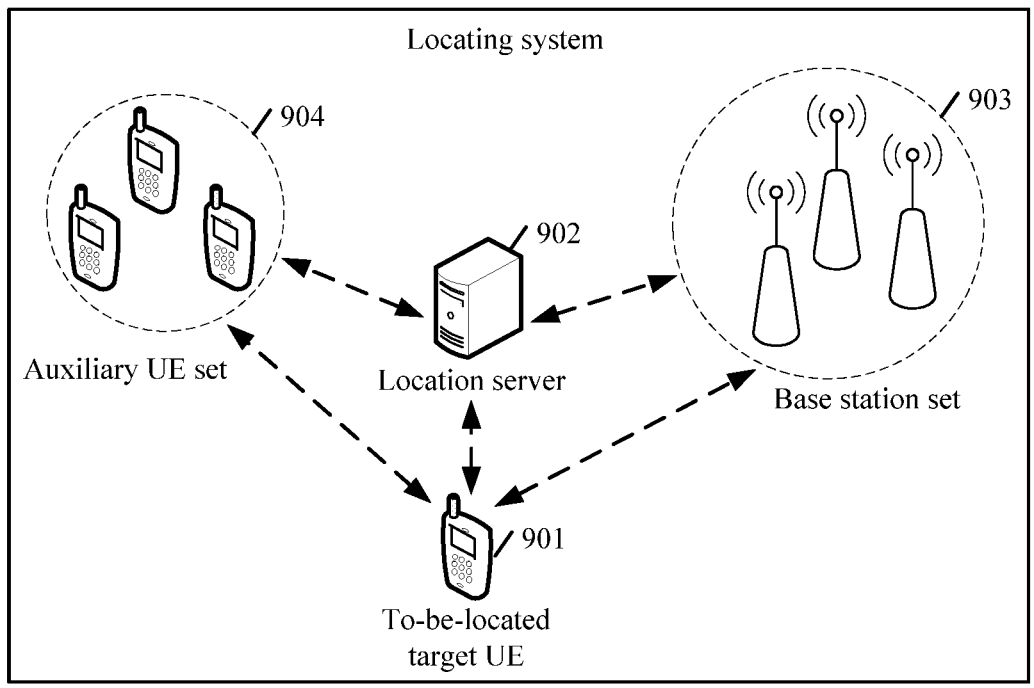
FIG. 9 is a schematic structural diagram of a locating system disclosed in an embodiment of the present invention.

FIG. 9 is a schematic structural diagram of a locating system according to an embodiment of the present invention. The locating system described in this embodiment includes to-be-located target UE 901, a location server 902, a base station set 903, and an auxiliary UE set 904.

The to-be-located target UE 901 is configured to send a location request to the location server 902.

The to-be-located target UE 901 is any one of a plurality of to-be-located UEs.

The location server 902 is configured to respond to the location request, and send measurement parameters for neighboring cell measurement and adjacent UE measurement to the to-be-located target UE 901.

The to-be-located target UE 901 is further configured to receive the measurement parameters, and perform neighboring cell measurement and adjacent UE measurement based on the measurement parameters, to obtain a neighboring cell measurement result and an adjacent UE measurement result.

The to-be-located target UE 901 is further configured to send the neighboring cell measurement result and the adjacent UE measurement result to the location server 902.

The location server 902 is further configured to determine, based on a preset base station selection rule and the neighboring cell measurement result, a base station set 903 participating in locating of the to-be-located target UE 901, and determine, based on a preset auxiliary UE selection rule and the adjacent UE measurement result, an auxiliary UE set 904 participating in locating of the to-be-located target UE 901.

The location server 902 is further configured to obtain a first PRS parameter set of the base station set 903 and a second PRS parameter set of the auxiliary UE set 904.

The location server 902 is further configured to send the first PRS parameter set and the second PRS parameter set to the to-be-located target UE 901.

The to-be-located target UE 901 is further configured to listen for, based on the first PRS parameter set, a PRS sent by each base station included in the base station set 903, and listen for, based on the second PRS parameter set, a PRS sent by each auxiliary UE included in the auxiliary UE set 904.

The to-be-located target UE 901 is further configured to obtain a first RSTD set of PRSs sent by any two base stations in the base station set 903 to the to-be-located target UE, and obtain a second RSTD set of a PRS sent by any auxiliary UE in the auxiliary UE set 904 to the to-be-located target UE and a PRS sent by a reference base station in the base station set to the to-be-located target UE.

The reference base station is a base station, in the base station set, that serves the to-be-located target UE and whose communication quantity meets a preset condition.

The to-be-located target UE 901 is further configured to send the first RSTD set and the second RSTD set to the location server 902.

The location server 902 is further configured to determine location information of the plurality of to-be-located UEs based on the first RSTD set, the second RSTD set, and location information of base stations included in the base station set 903.

It can be understood that functions of the to-be-located target UE 901, the location server 902, the base station set 903, and the auxiliary UE set 904 in this embodiment may be specifically implemented based on the method in the foregoing method embodiment. For a specific implementation process thereof, refer to related descriptions in the foregoing method embodiment. Details are not described herein again.

In this embodiment of the present invention, the to-be-located target UE performs neighboring cell measurement and adjacent UE measurement based on the measurement parameters, obtains the neighboring cell measurement result and the adjacent UE measurement result, and sends the neighboring cell measurement result and the adjacent UE measurement result to the location server. The location server determines, based on the preset base station selection rule and the neighboring cell measurement result, the base station set participating in locating of the to-be-located target UE, determines, based on the preset auxiliary UE selection rule and the adjacent UE measurement result, the auxiliary UE set participating in locating of the to-be-located target UE, and sends the first PRS parameter set of the base station set and the second PRS parameter set of the auxiliary UE set to the to-be-located target UE. The to-be-located target UE listens for, based on the first PRS parameter set, the PRS sent by each base station included in the base station set, listens for, based on the second PRS parameter set, the PRS sent by each auxiliary UE included in the auxiliary UE set, obtains the first RSTD set of PRSs sent by any two base stations in the base station set to the to-be-located target UE, obtains the second RSTD set of a PRS sent by any auxiliary UE in the auxiliary UE set to the to-be-located target UE and a PRS sent by a reference base station in the base station set to the to-be-located target UE, and sends the first RSTD set and the second RSTD set to the location server, so that the location server determines the location information of the plurality of to-be-located UEs based on the first RSTD set, the second RSTD set, and the location information of the base stations included in the base station set. A base station and a D2D technology between UEs are combined for locating, so that to-be-located UEs are allowed to exchange locating information, and the locating information is used for mutual verification, increasing information quantity of a combined locating hyperbolic equation set, and helping to improve locating accuracy. In addition, when there are insufficient available base stations, locating can also be completed accurately, thereby improving locating flexibility and universality.

It should be noted that, for brief description, the foregoing method embodiments are represented as a series of actions. However, a person skilled in the art should appreciate that the present invention is not limited to the described order of the actions, because according to the present invention, some operations may be performed in other orders or simultaneously. In addition, a person skilled in the art should also appreciate that all the embodiments described in the specification are example embodiments, and the related actions and modules are not necessarily mandatory to the present invention.

A person of ordinary skill in the art may understand that all or some of the operations of the methods in the embodiments may be implemented by a program instructing related hardware. The program may be stored in a computer readable storage medium. The storage medium may include a flash memory, a read-only memory (ROM), a random access memory (RAM), a magnetic disk, an optical disk, or the like.

What is disclosed above is merely example embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A network device, comprising:
a non-transitory memory storing executable instructions; and
a processor configured to execute the executable instructions to perform operations comprising:
determining, based on a preset base station selection rule and a neighboring cell measurement result that is sent by a to-be-located target user equipment (UE), a base station set participating in locating of the to-be-located target UE, wherein the to-be-located target UE is any one of a plurality of to-be-located UEs;
determining, based on a preset auxiliary UE selection rule and an adjacent UE measurement result that is sent by the to-be-located target UE, an auxiliary UE set participating in locating of the to-be-located target UE, wherein a device-to-device (D2D) connection is set up between the to-be-located target UE and each auxiliary UE comprised in the auxiliary UE set;
receiving, a first reference signal time difference (RSTD) set and a second RSTD set that are sent by the to-be-located target UE, wherein the first RSTD set is an RSTD set of positioning reference signals (PRSs) sent by any two base stations in the base station set to the to-be-located target UE, and the second RSTD set is an RSTD set of a PRS sent by any auxiliary UE in the auxiliary UE set to the to-be-located target UE through the D2D connection and a PRS sent by a reference base station in the base station set to the to-be-located target UE; and
determining, location information of the plurality of to-be-located UEs based on the first RSTD set, the second RSTD set, and location information of base stations comprised in the base station set.

2. The network device according to claim 1, wherein the operations further comprise:
receiving, a location request sent by the to-be-located target UE;
responding, to the location request, and configuring measurement parameters for performing neighboring cell measurement and adjacent UE measurement by the to-be-located target UE; and
receiving, a neighboring cell measurement result and an adjacent UE measurement result that are obtained by performing neighboring cell measurement and adjacent UE measurement based on the measurement parameters and that are sent by the to-be-located target UE.

3. The network device according to claim 1, wherein the operations further comprise:
obtaining a first PRS parameter set of the base station set and a second PRS parameter set of the auxiliary UE set; and
sending the first PRS parameter set and the second PRS parameter set to the to-be-located target UE, so that the to-be-located target UE listens for, based on the first PRS parameter set, a PRS sent by each base station comprised in the base station set, and listens for, based on the second PRS parameter set, a PRS sent through the D2D connection by each auxiliary UE comprised in the auxiliary UE set.

4. The network device according to claim 1, wherein the determining based on a preset base station selection rule and a neighboring cell measurement result that is sent by to-be-located target user equipment UE, a base station set participating in locating of the to-be-located target UE comprises:
obtaining an adjacent base station list and receive power that is of the to-be-located target UE and that is corresponding to adjacent base stations, wherein the adjacent base station list and the receive power are comprised in the neighboring cell measurement result sent by the to-be-located target user equipment UE; and
selecting from the adjacent base station list, a preset first quantity of base stations corresponding to relatively large receive power of the to-be-located target UE, and determining the preset first quantity of base stations as the base station set participating in locating of the to-be-located target UE.

5. The network device according to claim 1, wherein the determining based on a preset auxiliary UE selection rule and an adjacent UE measurement result that is sent by the to-be-located target UE, an auxiliary UE set participating in locating of the to-be-located target UE comprises:
obtaining an adjacent UE list and receive power that is of the to-be-located target UE and that is corresponding to adjacent UEs, wherein the adjacent UE list and the receive power are comprised in the adjacent UE measurement result sent by the to-be-located target UE; and
selecting from the adjacent UE list, a preset second quantity of UEs that send location requests to the network device and that are corresponding to relatively large receive power of the to-be-located target UE, and determining the preset second quantity of UEs as the auxiliary UE set participating in locating of the to-be-located target UE.

6. The network device according to claim 1, wherein the determining location information of the plurality of to-be-located UEs based on the first RSTD set, the second RSTD set, and location information of base stations comprised in the base station set comprises:
determining combined locating equations of the plurality of to-be-located UEs based on the first RSTD set, the second RSTD set, and the location information of the base stations comprised in the base station set; and
performing a plurality of iterations on the combined locating equations of the plurality of to-be-located UEs to solve the combined locating equations of the plurality of to-be-located UEs, and determining the location information of the plurality of to-be-located UEs based on solutions of the combined locating equations of the plurality of to-be-located UEs.

7. The network device according to claim 6, wherein the performing a plurality of iterations on the combined locating equations of the plurality of to-be-located UEs comprises:
obtaining a location error Cramér-Rao bound, obtained when each iteration starts, of each auxiliary UE comprised in the auxiliary UE set, and using an auxiliary UE with a minimum location error Cramer-Rao bound to participate in each iteration.

8. A communication device, comprising:
a non-transitory memory storing executable instructions; and
a processor configured to execute the executable instructions to perform operations comprising:
sending a neighboring cell measurement result and an adjacent user equipment (UE) measurement result to a location server, wherein the communication device is any one of a plurality of to-be-located UEs;
receiving a first positioning reference signal (PRS) parameter set of a base station set and a second PRS parameter set of an auxiliary UE set that are sent by the location server, wherein the base station set is determined by the location server based on a preset base station selection rule and the neighboring cell measurement result, the auxiliary UE set is determined by the location server based on a preset auxiliary UE selection rule and the adjacent UE measurement result, and a device-to-device (D2D) connection is set up between the to-be-located target UE and each auxiliary UE comprised in the auxiliary UE set;

listening for, based on the first PRS parameter set, a PRS sent by each base station comprised in the base station set, and listening for, based on the second PRS parameter set, a PRS sent through the D2D connection by each auxiliary UE comprised in the auxiliary UE set;

obtaining, a first reference signal time difference (RSTD) set of PRSs sent by any two base stations in the base station set to the to-be-located target UE, and obtaining a second RSTD set of a PRS sent by any auxiliary UE in the auxiliary UE set to the to-be-located target UE through the D2D connection and a PRS sent by a reference base station in the base station set to the to-be-located target UE; and sending the first RSTD set and the second RSTD set to the location server, so that the location server determines location information of the plurality of to-be-located UEs based on the first RSTD set, the second RSTD set, and location information of base stations comprised in the base station set.

9. The communication device according to claim 8, wherein the operations further comprise:

sending a location request to the location server;

receiving measurement parameters that are used for neighboring cell measurement and adjacent UE measurement and that are sent by the location server in response to the location request; and performing neighboring cell measurement and adjacent UE measurement based on the measurement parameters, to obtain the neighboring cell measurement result and the adjacent UE measurement result.

10. A target base station, comprising:

a non-transitory memory storing executable instructions; and a processor configured to execute the executable instructions to perform operations comprising:

determining a positioning reference signal (PRS) parameter for sending a PRS to a to-be-located target user equipment (UE), wherein the target base station is any one of a base station set determined by a location server, and the to-be-located target UE is any one of a plurality of to-be-located UEs;

sending the PRS parameter to the location server, so that the location server sends a PRS parameter set to the to-be-located target UE; and sending a PRS to the to-be-located target UE, so that the to-be-located target UE listens for the PRS based on the PRS parameter set, and sends, to the location server, a first reference signal time difference (RSTD) set of PRSs sent by any two base stations in the base station set to the to-be-located target UE, and a second RSTD set of a PRS sent by any auxiliary UE in an auxiliary UE set to the to-be-located target UE and a PRS sent by a reference base station in the base station set to the to-be-located target UE, so that the location server determines location information of the plurality of to-be-located UEs based on the first RSTD set, the second RSTD set, and location information of base stations comprised in the base station set.

11. The target base station according to claim 10, wherein the reference base station is a base station, in the base station set, that serves the to-be-located target UE and whose communication quantity meets a preset condition.

* * * * *